United States Patent [19]

Yoshida

[11] Patent Number: 5,413,524
[45] Date of Patent: May 9, 1995

[54] METHOD OF TAKING OUT VISCERA OF FISH AND APPARATUS THEREOF

[75] Inventor: Masanori Yoshida, Kushiro, Japan

[73] Assignee: Kabushiki Kaisha Nikko, Kushiro, Japan

[21] Appl. No.: 192,269

[22] Filed: Feb. 7, 1994

[30] Foreign Application Priority Data

Feb. 9, 1993 [JP] Japan .................................. 5-021428
Jul. 7, 1993 [JP] Japan .................................. 5-168080

[51] Int. Cl.⁶ ................................................ A22C 25/14
[52] U.S. Cl. ..................... 452/110; 452/106; 452/118; 452/160
[58] Field of Search ............... 452/110, 106, 121, 118, 452/160

[56] References Cited

U.S. PATENT DOCUMENTS

| | | | |
|---|---|---|---|
| 3,925,846 | 12/1975 | Leander | 452/106 |
| 4,562,793 | 1/1986 | Ryan | 452/110 |
| 4,630,335 | 12/1986 | Claudon | 452/110 |
| 5,106,334 | 4/1992 | Kristinsson | 452/106 |
| 5,226,848 | 7/1993 | Sigurdsson | 452/118 |

FOREIGN PATENT DOCUMENTS

| | | | |
|---|---|---|---|
| 35-8080 | 6/1960 | Japan . | |
| 60-41435 | 3/1985 | Japan . | |
| 141541 | 6/1988 | Japan | 452/106 |
| 4-16143 | 1/1992 | Japan . | |

*Primary Examiner*—Willis Little
*Attorney, Agent, or Firm*—Fish & Richardson

[57] ABSTRACT

A method and an apparatus for taking out the viscera of a fish. A fish, the head of which is cut off, is conveyed by conveying belts and the belly of the fish is incised with a cutting blade. The fish, the belly of which has been incised, is caused to rise along a bone-supporting plate to make the position of the bone constant. The pointed end of a membrane peeling-off blade is inserted into the top portion outside a coelomic membrane of the fish to strip the coelomic membrane from the fish. Since the viscera of the fish is wrapped in the coelomic membrane, the viscera is taken out from the fish meat by stripping the coelomic membrane from the fish meat.

3 Claims, 22 Drawing Sheets

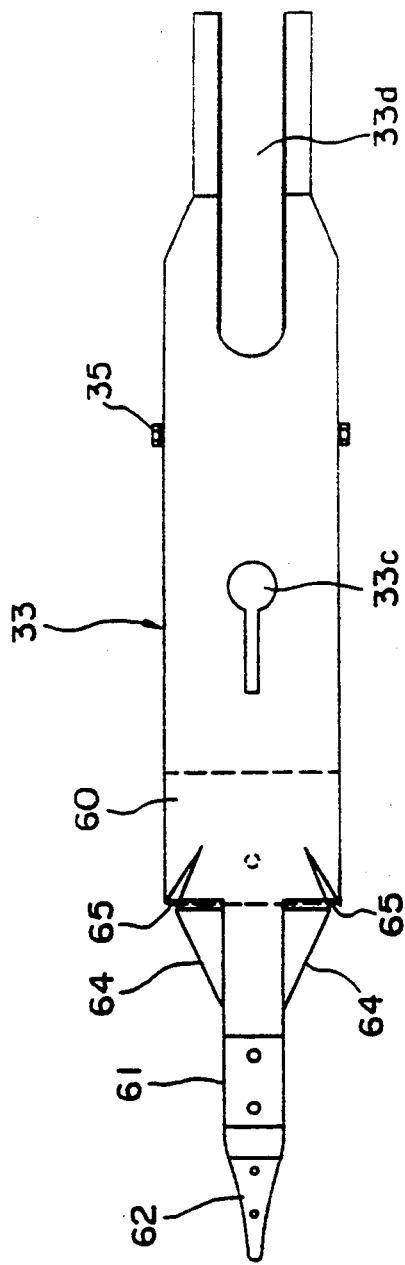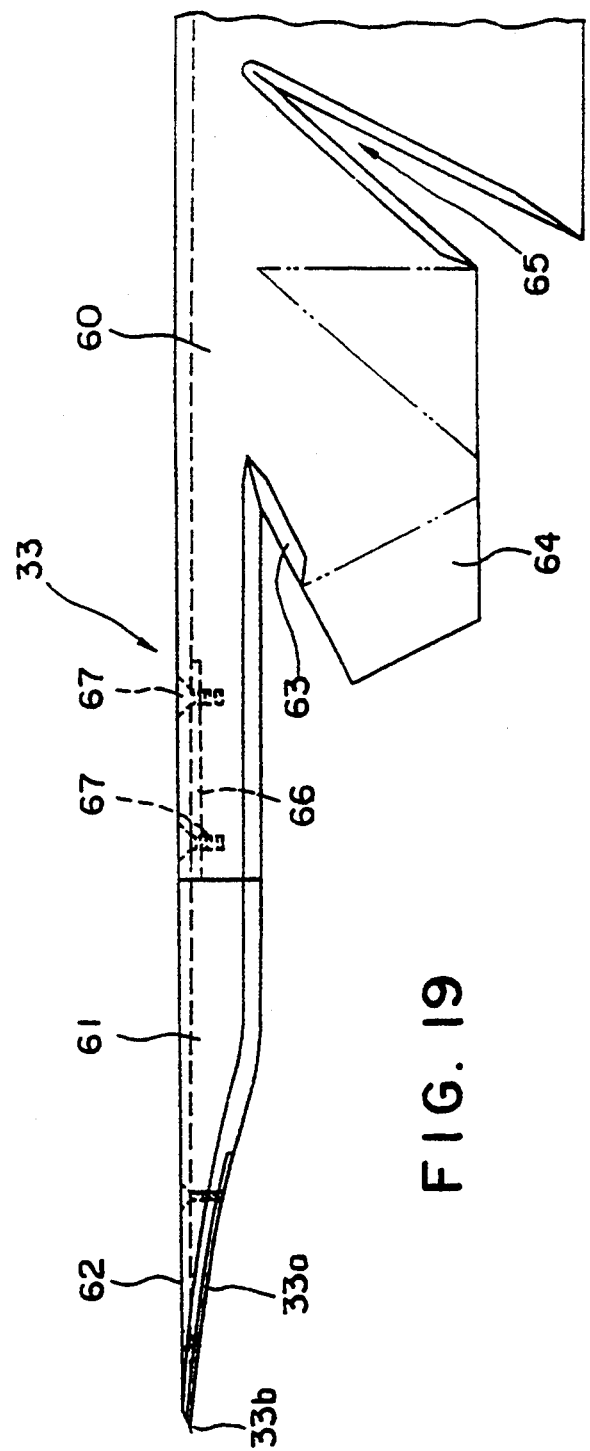
FIG. 18
FIG. 19

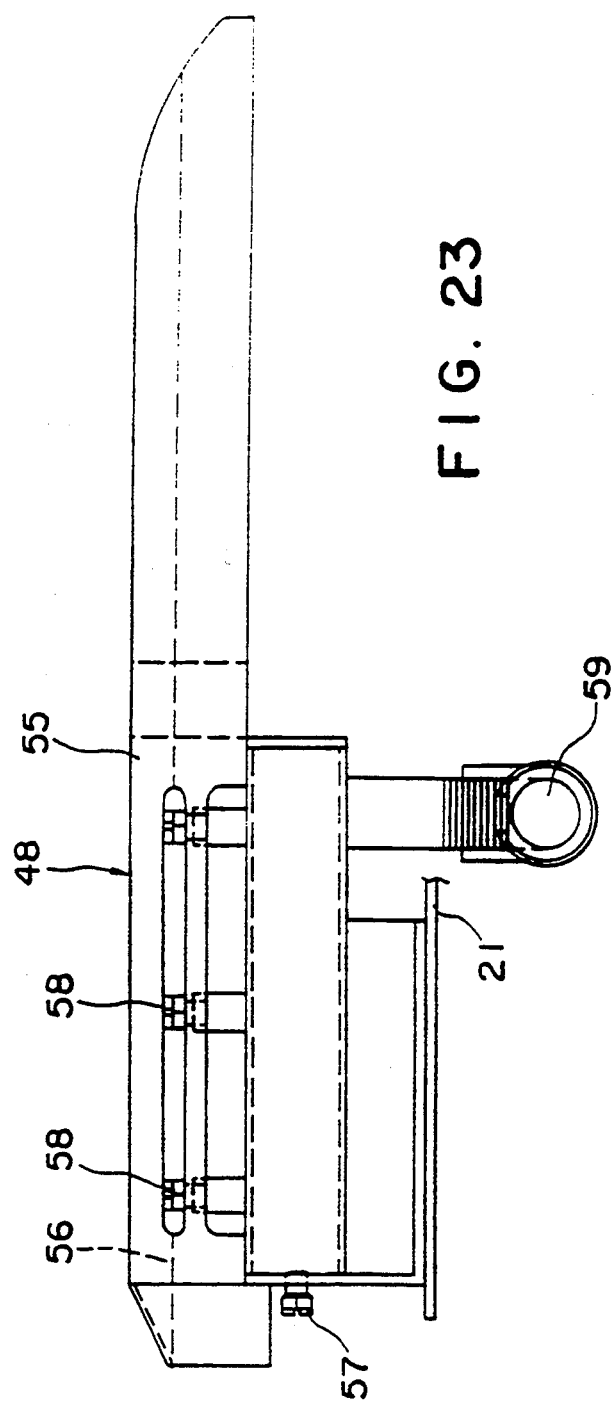
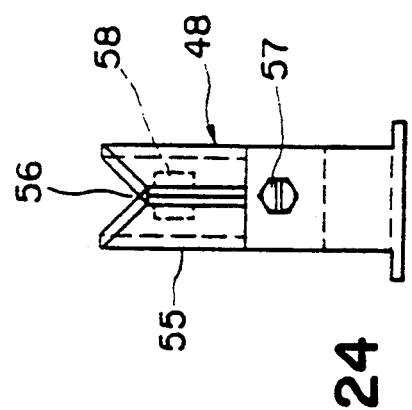

METHOD OF TAKING OUT VISCERA OF FISH AND APPARATUS THEREOF

FIELD OF THE INVENTION

This invention relates to a method of taking out the viscera of a fish and an apparatus for use in such a method, and more particularly to a method of taking out the viscera of a fish and an apparatus thereof which enables the viscera to be removed without damaging the fish meat, roes and viscera.

BACKGROUND OF THE INVENTION

Methods of taking out the viscera of a fish in prior arts are known, for example, from JP-A 16143 (1992) and U.S. Pat. No. 4,563,793. These methods comprise cutting the lower end of the belly of a fish with a cutter, and thereafter, inserting a rotary brush into the belly and scraping out the viscera and roes with it. Further, JP-B 8080 (1960) and JP-A 41435 (1985) each disclose a method comprising piercing fish with a guide rod so it passes through from the head side to the anus of a fish while continuously moving the fish forward, moving the fish along the guide rod and incising the belly of the fish.

In the above-mentioned conventional methods, since roes are scraped out with a rotary brush, there is a problem of roes being damaged, lowering their value as a commodity. Moreover, removing the viscera with the rotating wheel makes it impossible to completely remove the coelomic membrane wrapping the viscera. In addition, when the rotating wheel is pressed against the inner wall surface of the fish meat to completely remove the coelomic membrane, another problem of the fish meat being damaged arises.

In general, on the top outside the coelomic membrane exists a blood reservoir linearly along the bone. Since the coelomic membrane can not completely be removed as described above, there is a problem of the blood reservoir being left in the fish meat after removal of the viscera. Further, in the case where the blood reservoir is removed using water under high pressure, the fish meat is damaged and such an operation is time consuming and expensive.

Moreover, in the case of the method of scraping out the viscera and roes with the rotary brush, a change in the size of a fish can not be coped with, and if a rotary brush larger than the one required is used, there is a danger of the fish meat being damaged, and in the case of larger fishes, there is a danger of parts which can not be removed remaining therein.

In general, in spite of differences in the size of the fish to be processed, a uniform processing is performed in the steps of cutting the belly and removing the viscera, so that the fish meat and roes are damaged.

SUMMARY OF THE INVENTION

An object of the invention is to provide a method and an apparatus of taking out the viscera of a fish, which permits the viscera and the like to be removed from the fish body without damaging the fish meat, roes, viscera and the like and which is able to cope with a change in the size of a fish.

In order to achieve the above-mentioned object, according to the present invention, there is provided a method of taking out the viscera, comprising the steps of incising the belly of a fish while moving the fish forward, the head of which is cut and removed, subsequently inserting a blade for peeling off the coelomic membrane in between the inner wall of the fish meat and the coelomic membrane from the head side of the fish, and stripping the roes and viscera together with said coelomic membrane from the fish meat.

Further, in order to achieve the above-mentioned object, there is provided an apparatus for taking out the viscera of a fish according to the present invention, comprising a guide rod which is positioned at the upstream side of a cutting blade and adapted to be inserted into the fish body from the head side thereof and to be taken out of the anus, and which serves to control the position of the fish body when being cut; a stationary bone-supporting plate which is positioned at the downstream side of the cutting blade and has an upper surface inclined downstream with a rising gradient to place the bone within the fish body thereon to cause the fish to rise, thereby performing the positioning of the bone of the fish body; and a blade for peeling off the coelomic membrane, which is positioned at the downstream side of the bone-supporting plate and which has an inverted U-shaped cross section which is adapted to be inserted in between the inner wall of the fish meat and the coelomic membrane and enables the roes, viscera and the like to be stripped together with the coelomic membrane from the fish meat.

In the method of taking out the viscera of a fish according to the invention, the head is cut off and the membrane peeling-off blade is inserted in between the wall of the fish meat and the coelomic membrane from the head side. With this operation, the roes, viscera and the like are peeled off and removed together with the coelomic membrane from the fish meat. This enables the viscera and the like to be removed without damaging not only the fish meat but also the roes, viscera and the like, and further enables the coelomic membrane to be perfectly removed.

With the apparatus of taking out the viscera of a fish according to the invention, the fish, the head of which is cut off, is moved forward by means of a carrying means such as a conveyor belt, the guide rod is inserted into the fish body from the head side of the fish and drawn out from the anus, to thereby control the position of the fish when being cut, and at the same time, the belly of the fish while being moved is incised with the cutting blade. The stationary bone-supporting plate is inserted into the fish body, the belly of which is already incised, the bone within the fish body is set on the upper surface of the stationary bone-supporting plate inclined downstream with a rising gradient to cause the fish to rise, to thereby perform the positioning of the bone of the fish, and at the same time, the fish is guided toward the membrane peeling-off blade. From the head side of the fish positioned by the bone-supporting plate, the membrane peeling-off blade is inserted in between the inner wall of the fish meat and the coelomic membrane, and peels the roes, viscera and the like together with the coelomic membrane from the fish meat. This operation permits the viscera and the like to be removed together with the coelomic membrane from the fish body without damaging not only the fish meat but also the roes, viscera and the like.

BRIEF DESCRIPTION OF DRAWINGS

Other features and advantages of the invention will be apparent from the following description taken in connection with the accompanying drawings, wherein:

FIG. 18 is a plan view of the membrane peeling-off blade;

FIG. 19 is a front view of a portion of the membrane peeling-off blade;

FIG. 23 is a front view of a washing nozzle block;

FIG. 24 is a side view as viewed from the left in FIG. 23;

PREFERRED EMBODIMENTS OF THE INVENTION

Figure 1:
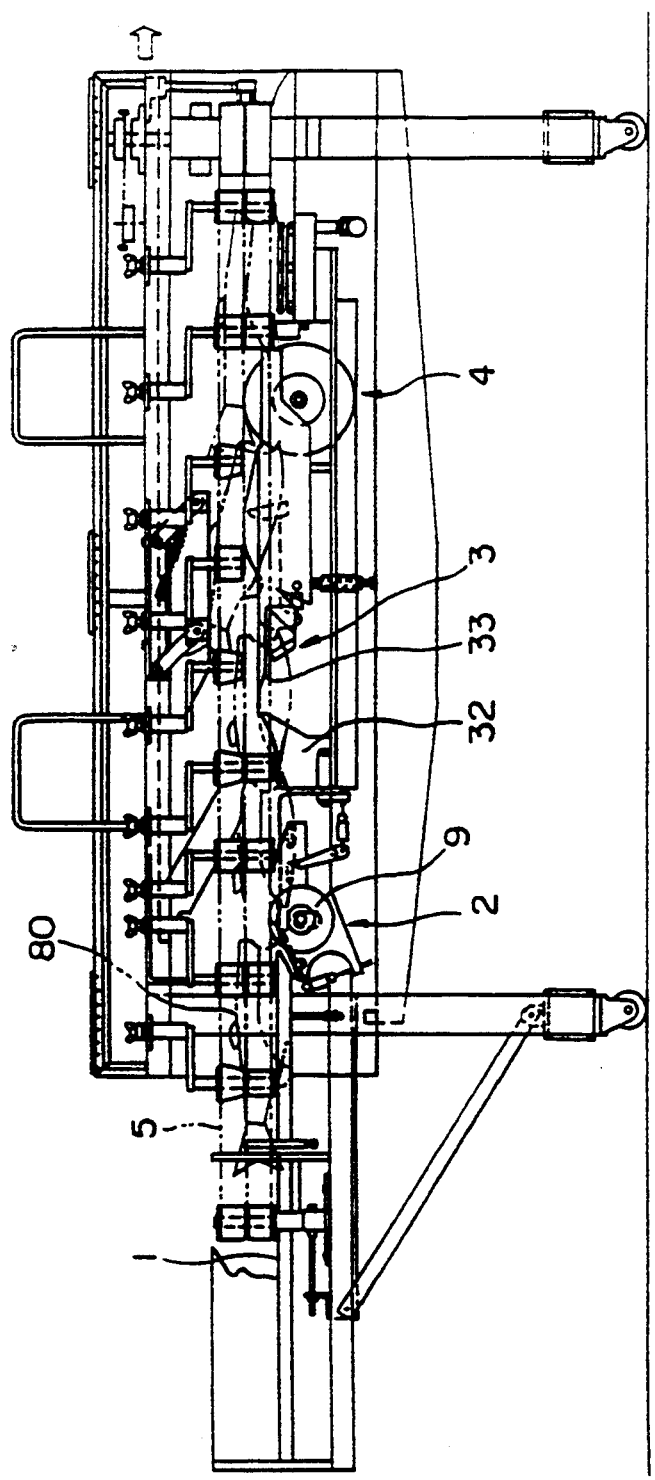
FIG. 1 is a view showing the entire construction of an apparatus of taking out the viscera of a fish according to one embodiment of the invention.

Now, an embodiment of the invention is explained with reference to the drawings. FIGS. 1 to 25 show an example of an apparatus of taking out the viscera of a fish according to the invention. As shown in FIG. 1, this apparatus performs the incision of the belly of a fish 80 and the removal of the viscera in that order while the fish 80, the head of which is cut off, is moved in the forward (head direction) with the belly directed downward, and is composed of a belly-supporting plate 1, a belly-incising mechanism 2, a membrane peeling-off mechanism 3 and a blood reservoir-removing mechanism 4 which are arranged in the carrying direction in this order. The fish 80 is held at both sides by a conveying belt 5 and is adapted to be carried from the belly-supporting plate 1 at the upstream side to the blood reservoir-removing mechanism 4 at the downstream side.

Figure 6:
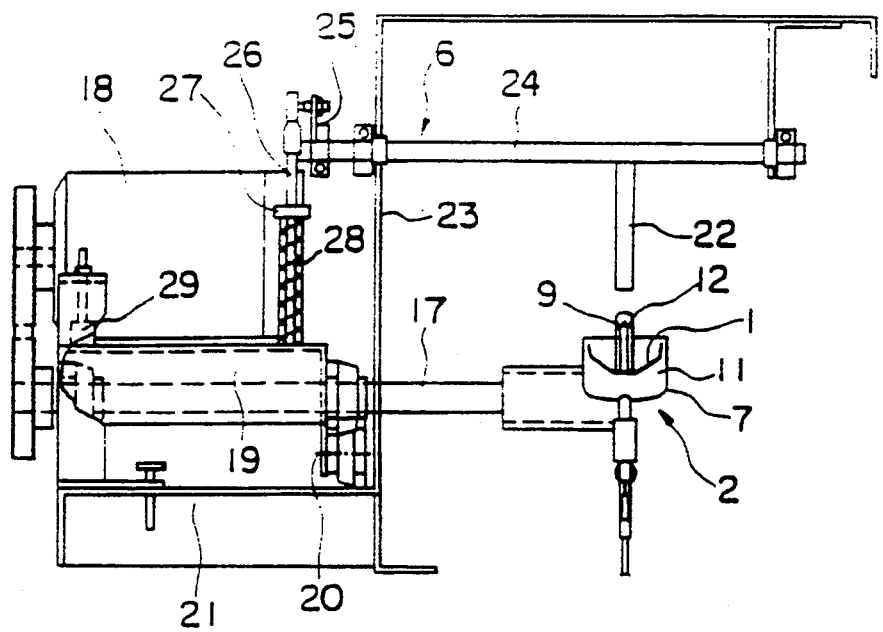
FIG. 6 is a sectional view of an essential portion as viewed in the direction of line VI—VI of FIG. 2.

As shown in FIG. 6, the belly-supporting plate 1 is in the form of a trough extending in the carrying direction, and allows the belly of the fish 80 to be placed thereon and the fish 80 to be fed in a sliding motion to the belly-incising mechanism 2.

The belly-incising mechanism 2 is provided adjacent to the downstream side of the belly-supporting plate 1 and comprises a rotary cutting blade 9 for cutting out the belly of the fish from below; a slide guide 10 for guiding the advancement of the fish during incision of the belly; a position controlling mechanism 6 for controlling the positions of both the rotary cutting blade 9 and the slide guide 10 (FIGS. 6 and 7) and a first holding-down guide 30 for preventing the fish 80 from rising during incision of the belly.

The slide guide 10 is supported on a frame 7 so as to be able to be moved to the front and to the rear in a predetermined range. The frame 7 is pivotably supported by a pivot 8 at the downstream end of the belly-supporting plate 1 so that the upstream end thereof can be moved up and down in a predetermined range. At the forward side of the frame 7 is arranged a cutting blade 9 rotatably supported by a shaft 17, with the upper end thereof projecting upwardly from the bottom of the belly-supporting plate 1. Further, at the front end of the frame 7 is formed an inclined surface inclined downwards toward the upstream side. Along the inclined surface of the frame 7 is attached a belly-supporting guide 11, which extends on either side in a predetermined width so that the belly of the fish 80 can be placed thereon, as shown in FIG. 6. The top of the cutting blade 9 projects upwardly from the slot provided at the middle of the belly-supporting guide 11.

Figure 3:
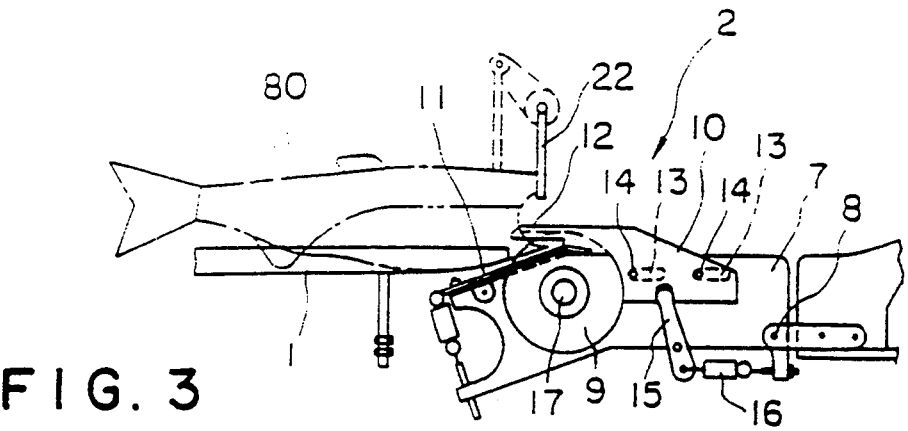
FIG. 3 is a front view showing a belly-supporting plate and a mechanism for incising the belly.
Figure 4:
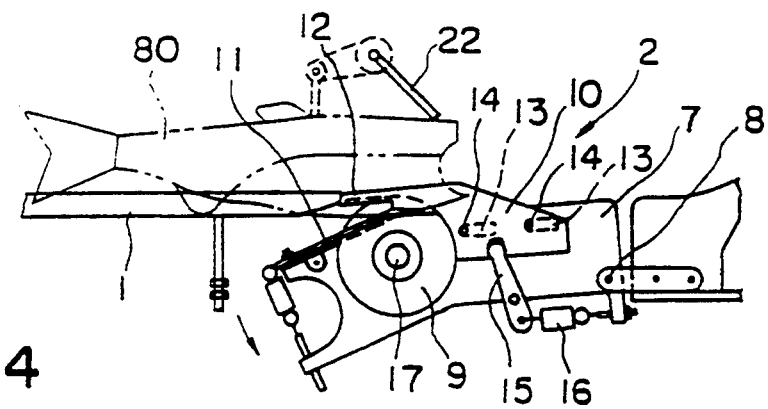
FIG. 4 is a front view showing a belly-supporting plate and a mechanism for incising the belly.
Figure 5:
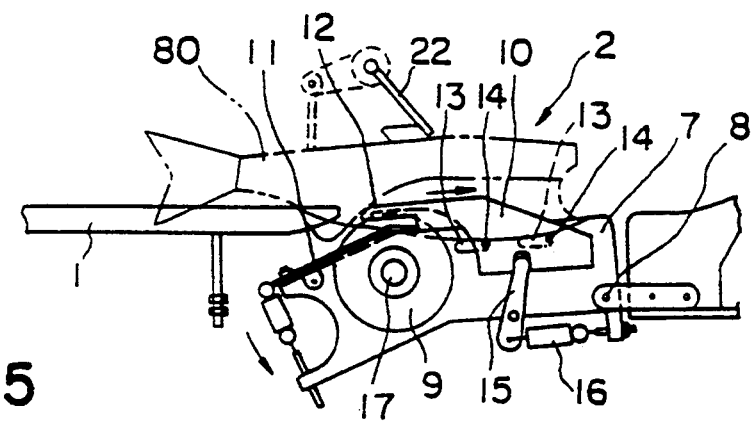
FIG. 5 is a front view showing a belly-supporting plate and a mechanism for incising the belly.

As shown in FIGS. 3 to 5, the slide guide 10 is supported by pins 14 in longitudinal slots 13 so as to be able to be moved to the front and to the rear, and is energized upstream relative to the frame 7 through a lever 15 by a spring 16. Further, the slide guide 10 is provided with an inserting portion 12 which extends upstream and covers the upper portion of the cutting blade 9. The inserting portion 12 extends making a predetermined angle with the belly-supporting guide 11 so that the space between the inserting portion 12 and the belly-supporting guide 11 opens toward the front end thereof. As shown in FIG. 6, the inserting portion 12 has an inverted U-shaped cross section and receives therein the cutting blade 9 projecting upwardly from the belly-supporting guide 11.

As shown in FIG. 6, the position controlling mechanism 6 transmits the pivotal movement of the rotary arm 22, through a shaft 24, a lever 25, a rod 26, a spring 28 and a supporting frame 19, to the frame 7.

The supporting frame 19 is positioned at the side lateral to the cutting blade 9 and pivotably connected at a pivot 20 to the upper face of a base 21. A motor 18 connected to the rotary shaft 17 of the carting blade 9 is mounted on the supporting frame 19. The pivot 20 is located concentrically with the pivot 8 of the frame 7, and the frame 7 and the supporting frame 19 are connected with each other through the shaft 17. Accordingly, the frame 7 can be pivotably moved about the pivot 8 together with the supporting frame 19. In addition, the supporting frame 19 is biased so that it is rotated counterclockwise about the pivot 20 together with the frame 7 in FIG. 7. The counterclockwise pivotal movement of the supporting frame 19 is controlled by a stopper 29.

Figure 7:
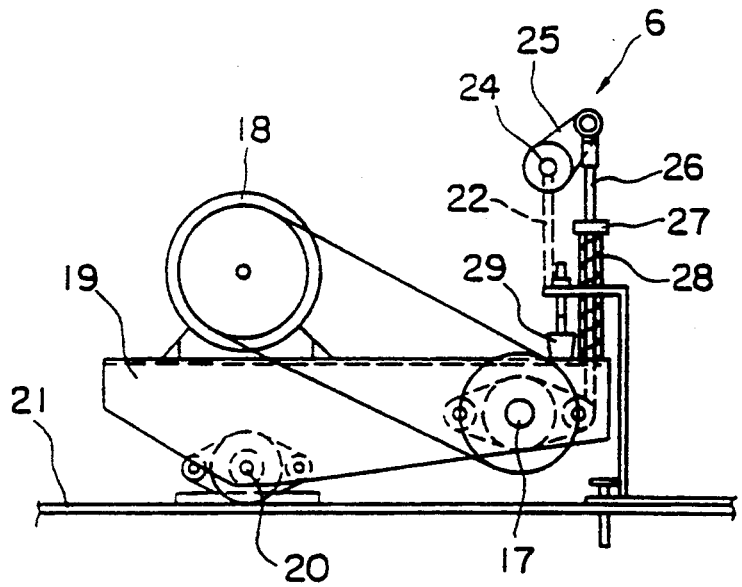
FIG. 7 is a view as viewed from the back of the essential portion in FIG. 6.

The rotary arm 22 is positioned over the cutting blade 9 and arranged with the end directed to the cutting blade 9 so that the rotary arm 22 comes into contact with the upper surface of the fish 80 which is being moved under the rotary arm 22. As shown in FIGS. 6 and 7, the base end of the rotary arm 22 is secured to the shaft 24 rotatably supported on a machine frame 23. On one end of the shaft 24 is firmly mounted the lever 25, to the end of which is pivotably connected the rod 26. Accordingly, when the rotary arm 22 is pressed and pivotably moved by the fish 80, which is being moved under the rotary arm 22, the rod 26 is caused to be moved upwardly or downwardly. The lower portion of the rod 26 is passed through the supporting frame 19 so as to be able to be vertically moved, and the spring 28 is interposed between a spring receiving member 27 secured to the middle portion of the rod 26 and the supporting frame 19. Accordingly, the rod 26 is connected through the spring 28 to the supporting frame 19, and the up and down movement of the rod 26 enables the supporting frame 19 to be pivotally moved clockwise or counterclockwise about the pivotal shaft 20.

Figure 2:
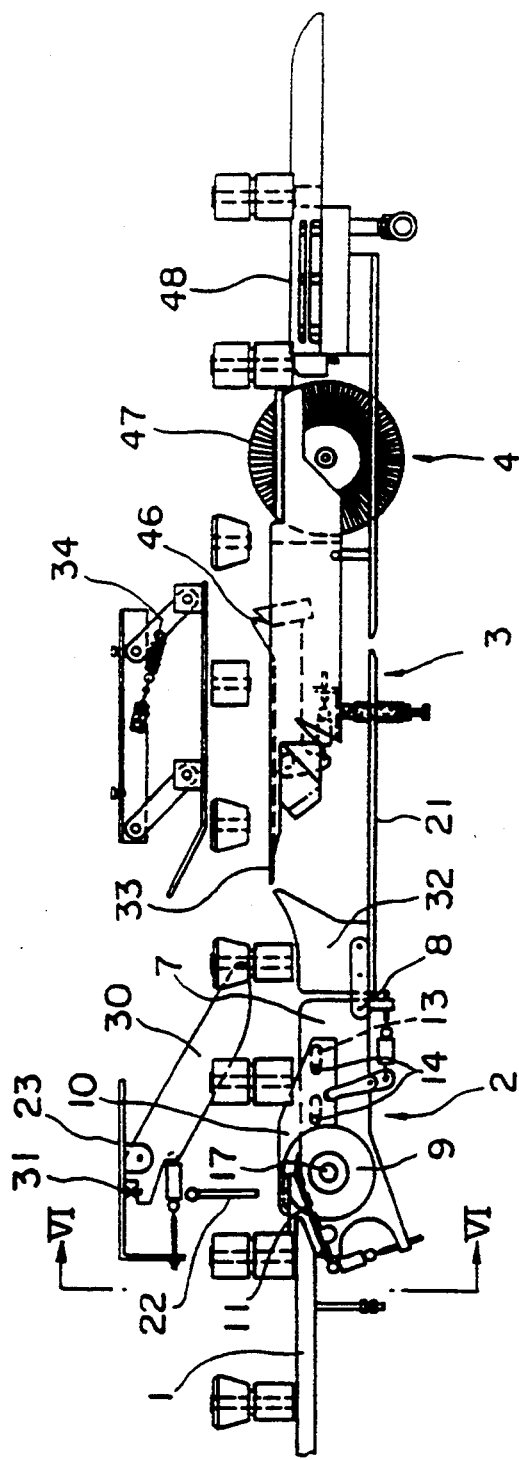
FIG. 2 is a front view of an essential portion in FIG. 1.
Figure 8:
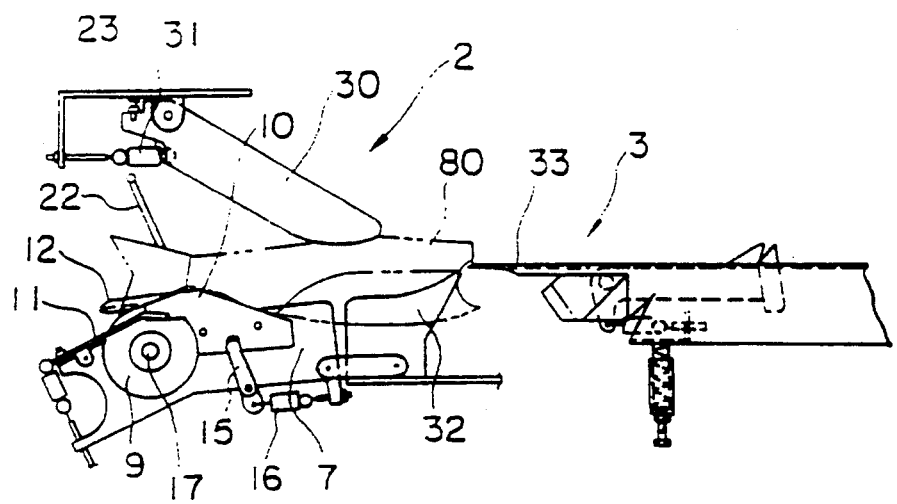
FIG. 8 is a front view showing the belly-incising mechanism and a membrane peeling-off mechanism.
Figure 9:
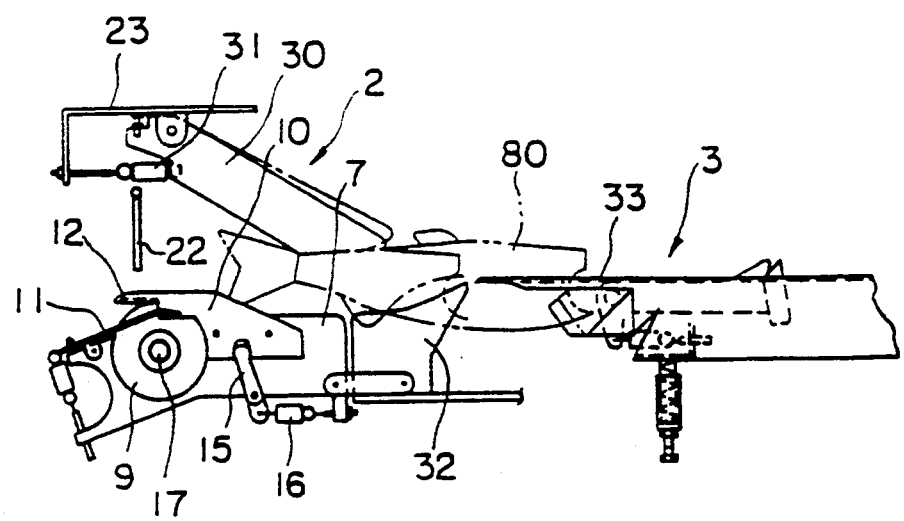
FIG. 9 is a front view showing the belly-incising mechanism and the membrane peeling-off mechanism.

As shown in FIGS. 2, 8 and 9, the first holding-down guide 30 is positioned over the slide guide 10, and arranged with the end directed obliquely downward to the downstream side so that it comes into contact with the upper surface of the fish 80 which is being moved thereunder. The holding-down guide 30 is pivotably connected at the upper end thereof to the machine frame 23 and biased so as to be able to be rotated clockwise in FIG. 8. Accordingly, the end of the holding-down guide 30 can be brought into contact with the upper surface of the fish 80, which is being moved thereunder, to thereby press the fish 80 downwardly.

Figure 10:
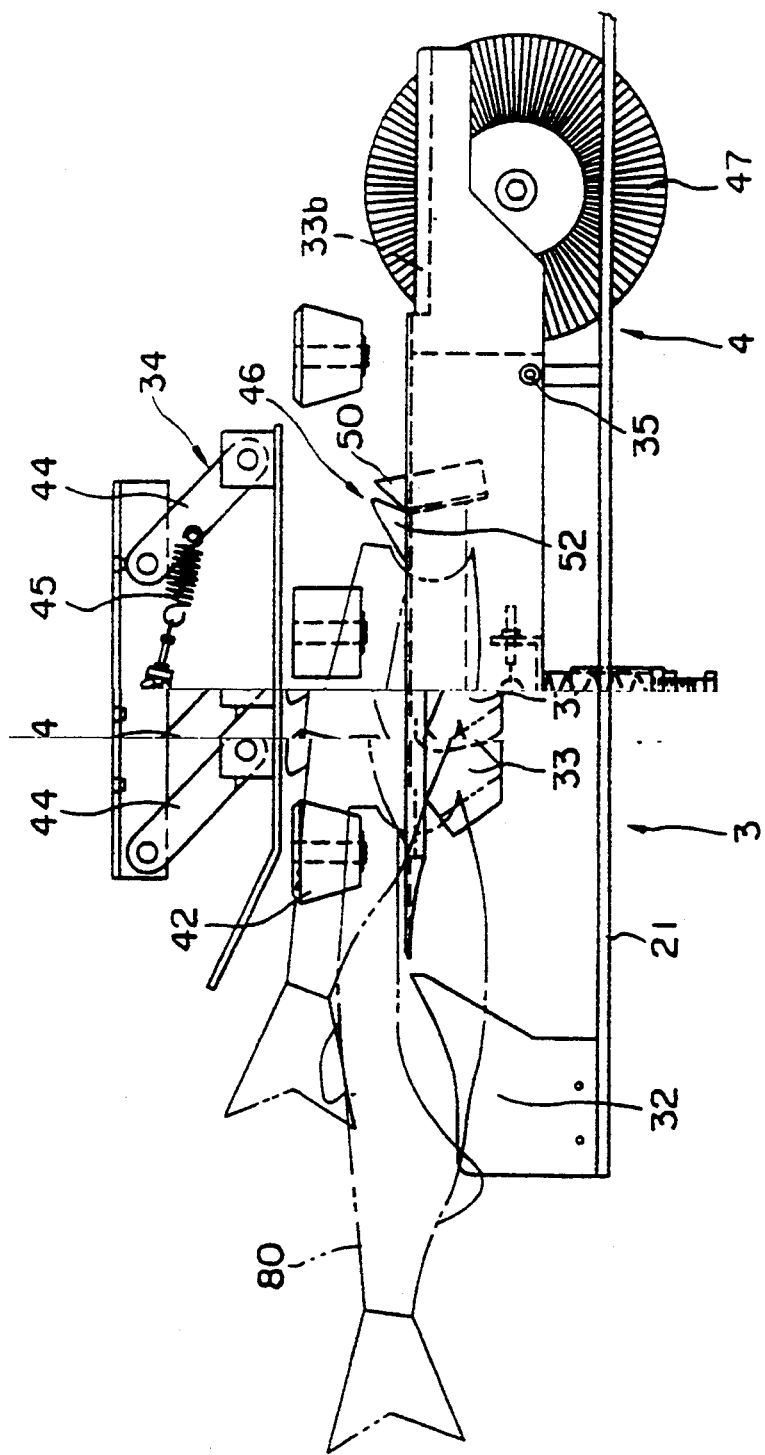
FIG. 10 is a front view showing the membrane peeling-off mechanism.
Figure 11:
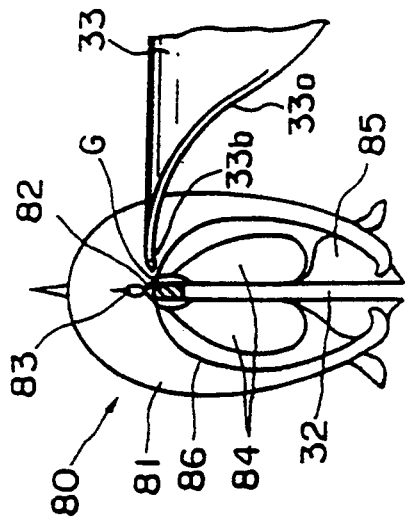
FIG. 11 is an explanatory view showing a relation in position between a membrane peeling-off blade and a fish which has been carried to the downstream end of a bone-supporting plate.

As shown in FIGS. 2, 10 and 11, a membrane peeling-off mechanism 3 comprises a stationary plate 32 on which the bone of the fish 80, which has passed on the slide guide 10, is placed and guided to a predetermined position at the downstream side; a membrane peeling-off blade 33 which is to be inserted into the body of the fish 80, which has passed on the stationary plate 32, and which scrapes off and removes the coelomic membrane of the fish 80; and a second holding-down guide 34 which is positioned over the membrane peeling-off blade 33 to prevent the fish 80 from rising.

The stationary plate -32 is fixed to the base 21 adjacent to the downstream side of the frame 7. FIG. 11 is an explanatory view showing the relation in position among the stationary plate 32, fish 80 and membrane peeling-off blade 33. Referring to FIG. 11, the stationary plate 32 is disposed so that it can enter into the body of the fish 80, which has just passed on the slide guide 10, and allows the bone 82 to be placed thereon and to be guided to a predetermined position of the membrane peeling-off blade 33 adjacent to it. In FIG. 11, reference character 81 indicates a fish meat, 83 a blood reservoir, 84 roes, and 85 the viscera, and the blood reservoir 83 exists in the condition where it is covered with the coelomic membrane 86 along the bone 82. Further, the roes 84 and the viscera 85 are wrapped in the belly in the condition where they are covered with the coelomic membrane 86. The stationary bone-supporting plate 32 performs the positioning of the bone 82 in the vertical direction and is inclined in such a manner as to gradually rise toward the downstream side so that the end of the membrane peeling-off blade 33 can be surely inserted into the gap G between the blood reservoir 83 and the coelomic membrane 86.

As shown in FIG. 11, the membrane peeling-off blade 33 has the inverted U-shaped cross section of a groove, and both lateral edges of the front end are cut off into the curved surfaces 33a and the front end 33b positioned at the top is sharpened. The membrane peeling-off blade 33 is provided at the downstream side of the stationary plate 32 so that the front end 33b proceeds smoothly along with the upper surface of the stationary plate 32. As the fish 80 is moved along the stationary plate 32 to the downstream side, the front end 33b of the membrane peeling-off blade 33 is inserted gradually deeper into the gap G between the blood reservoir 83 and the coelomic membrane 86, to thereby strip off the coelomic membrane 86, so that the roes 84 and viscera 85 can be stripped from the fish meat 81 together with the coelomic membrane 86.

Figure 17:
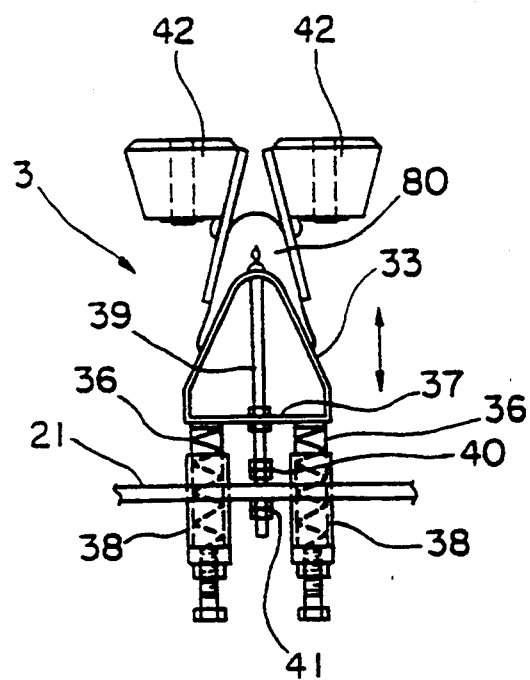
FIG. 17 is an explanatory view of the operation of the membrane peeling-off mechanism as viewed from the lateral side.

As shown in FIG. 10, the membrane peeling-off blade 33 is pivotably supported by a pivot 35 on the base 21 at the downstream side and supported on the base 21 through a spring 36 so as to be able to be moved up and down in a predetermined range. As shown in FIG. 17, at the lower portion of the pointed end portion of the membrane peeling-off blade 33 is passed over a bottom plate 37, at the lower surface of which are secured springs 36 and a threaded rod 39 extending downwardly. Spring receiving tubes 38, which receive the springs 36, are passed through the base 21 and fixed thereto. The threaded rod 39 is passed through the base 21 so as to be able to be moved up and down, and is threadably engaged by stop nuts 40, 41 which are positioned above and below the base 21. The range of the up and down movement of the pointed end of the membrane peeling-off blade 33 can be adjusted by shifting the positions of the stop nuts 40, 41.

Figure 20:
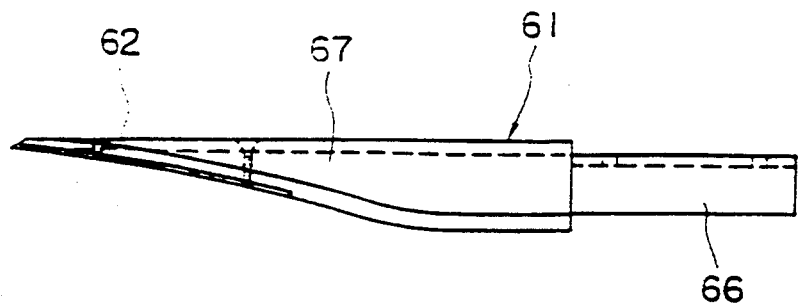
FIG. 20 is a front view showing a holder.
Figure 21:
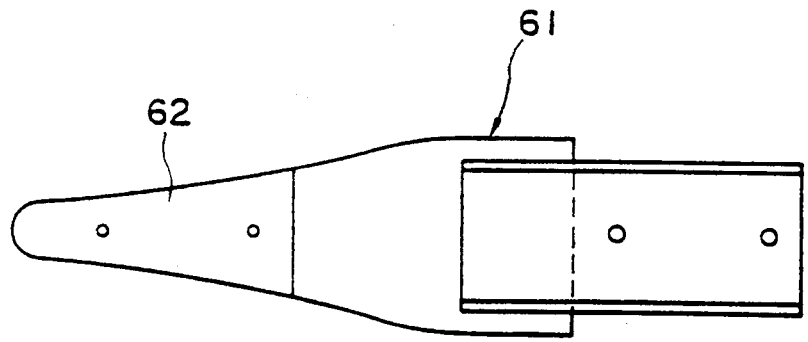
FIG. 21 is a view of the holder shown in FIG. 20 as viewed from below.

FIGS. 19 to 21 are views showing the membrane peeling-off blade 33 in more detail. Referring to these drawings, the membrane peeling-off blade 33 comprises the body part 60 of the membrane peeling-off blade; a holder part 61 detachably fitted to the end of the body part 60 and a blade part 62 detachably attached to the end of the holder part 61.

The body part 60 is provided with a first notched part 63, a belly-enlarging part 64 and a second notched part 65. The first notched part 63 at the front lower side is used for cutting the viscera. The second notched part 65 positioned at the back side thereof serves to cut off and remove the remaining viscera which have not been cut out by the first notched part 63, and the inclined angle of the notch is larger than that of the first notched part 63. The belly-enlarging part 64 is provided to protrude at the lower portion of the notched part 63.

As shown in FIGS. 19 and 21, the holder part 61 comprises a fitting engagement part 66 secured to the lower face of the front end of the body part 60 by means of counter-sunk head screws 67, and a blade fitting part 67 to which the blade part 62 is fitted.

The blade part 62 has a cross section of a sharpened shape so that the pointed end can enter into a portion of the blood reservoir 83 of the fish 80, and is detachably secured to the holder part 61 by means of counter-sunk head screws. The shape of the blade part 62 after it is secured to the holder part 61 is such that as described above, movement of the fish 80 causes the blade part 62 to be inserted in between the coelomic membrane 86 and the blood reservoir 83, performing the function of stripping the coelomic membrane 86 from the fish meat 81.

The detachable holder part 61 and blade part 62 as described above enables the repair of the blade part 62 to be easily performed when the sharpness thereof becomes blunt. That is, since the holder part 61 is first removed, and subsequently, the blade part 62 can be removed and changed, the blade part 62 is easy to change.

Moreover, since the operation of changing the blade part 62 can be performed with the body part 60 remaining fixed, an operation of adjusting the position of the blade edge is hardly required.

Further, the material of the holder part 61 and blade part 62 can be changed and produced, thereby permitting the performance of the blade part 62 to be effectively improved.

Figure 16:
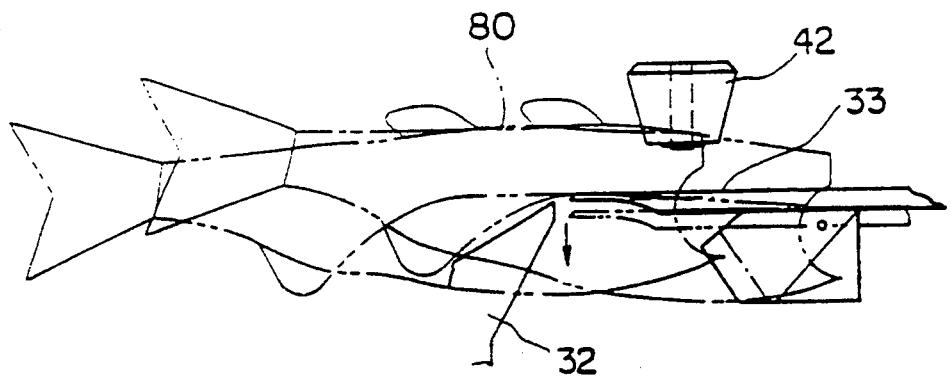
FIG. 16 is an explanatory view of the operation of the membrane peelings-off mechanism as viewed from the front.

As shown in FIGS. 10, 16 and 17, upwardly at both sides in the vicinity of the pointed end of the membrane peeling-off blade 33 is provided holding-down rollers 42 whose diameter tapers off downward, whereby the fish 80 passing through the gap between the rollers 42 and 42 can be forced down toward the membrane peeling-off blade 33, as shown in FIG. 17.

The second holding-down guide 34 has a construction of a holding-down plate 43 suspended from the mechanical frame 23 by links 44, as shown in FIG. 10. The links 44 are obliquely arranged with the lower ends directed to the downstream side and energized so as to be normally restored to their predetermined original positions. Accordingly, when the upper surface of the fish 80 which is passing thereunder comes into contact with the holding-down plate 43, the holding-down plate 43 enables the fish 80 to be forced down toward the membrane peeling-off blade 33 by the biasing force of a spring 45.

Figure 12:
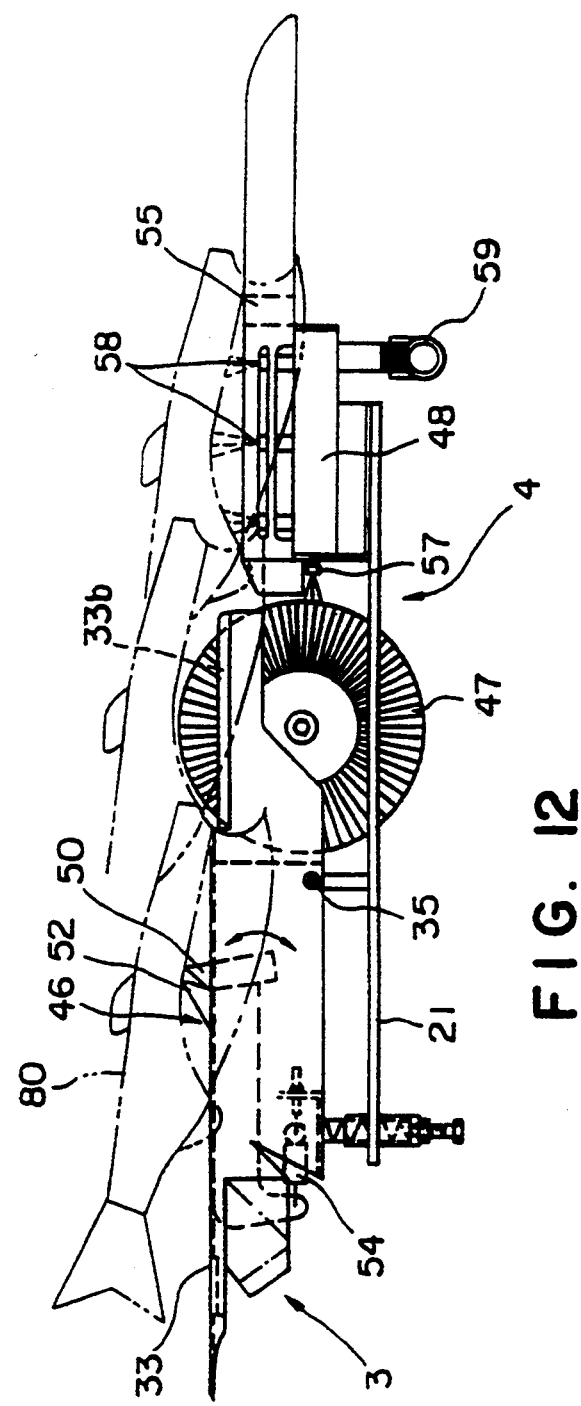
FIG. 12 is a front view showing the membrane peeling-off mechanism and a blood reservoir-removing mechanism.

As shown in FIG. 12, a blood reservoir-removing mechanism 4 comprises a scraping member 46 provided so that the end thereof protrudes from the upper surface of the membrane peeling-off blade 33, a rotary brush 47 provided at the downstream side of the membrane peeling-off blade 33 and a washing nozzle block 48.

Figure 13:
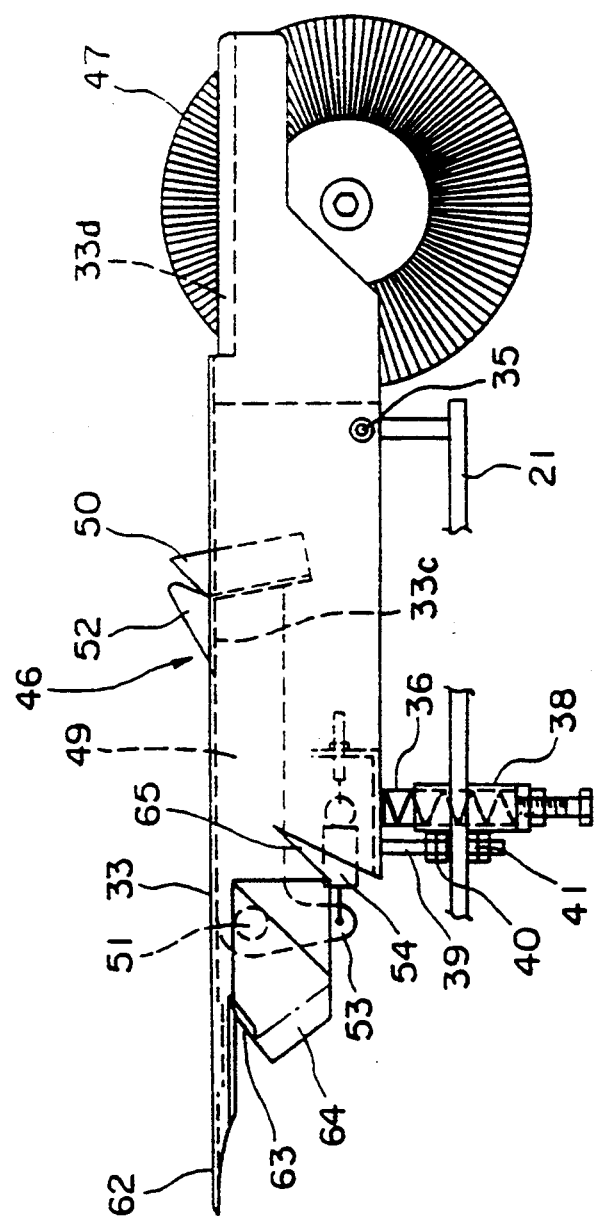
FIG. 13 is a front view of an essential portion of the membrane peeling-off mechanism.
Figure 14:
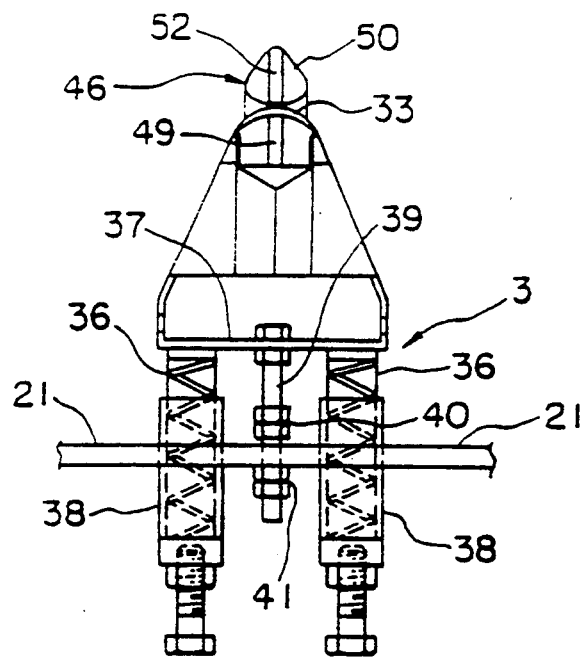
FIG. 14 is a side view as viewed from the left in FIG. 13.
Figure 22:
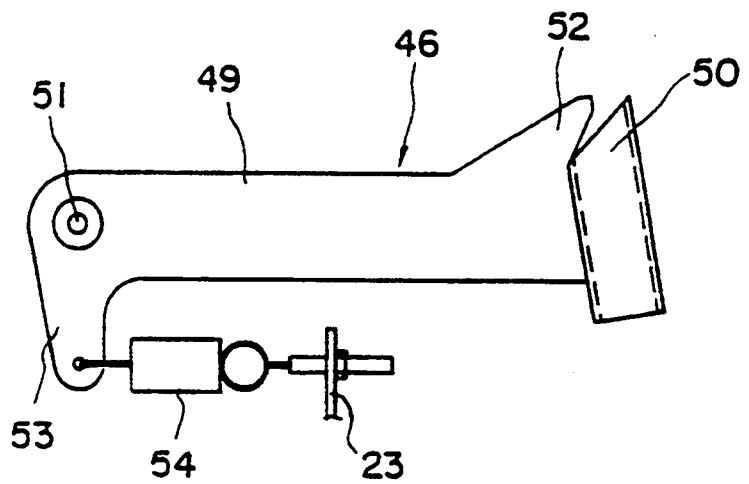
FIG. 22 is a front view of a blood reservoir scraping-off member.

As shown in FIGS. 13, 14 and 22, the scraping member 46 is provided with a pushing-up guide plate 49 and a scraper 50. The pushing-up guide plate 49 is provided under the membrane peeling-off blade 33 and is bent down at the end directed to the upstream side, and the bent portion thereof is pivotably connected to the lower portion of the membrane peeling-off blade 33 by a pivot 51. The pushing-up guide plate 49 has a projection 52 which rises upwardly at the end of the downstream side and projects upwardly from the opening 33c of the membrane peeling-off blade 33. The scraper 50 is located at the downstream side of the projection 52 and secured to the end of the pushing-up guide plate 49 so as to protrude upwardly from the opening 33c of the membrane peeling-off blade 33 in opposite relation to the projection 52. Between the lower end of an arm 53, extending downwardly from the pivotally supported portion of the pushing-up guide plate 49, and the mechanical frame 23 is interposed a spring 54 so that the pushing-up guide plate 49 is biased so as to be pivotably moved in the direction of causing the projection 52 to project upwardly from the membrane peeling-off blade 33.

Figure 15:
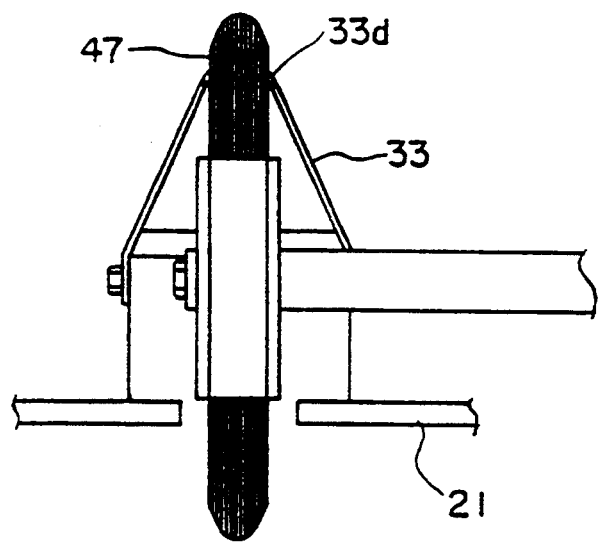
FIG. 15 is a side view as viewed from the right in FIG. 13.

As shown in FIGS. 13 and 15, the rotary brush 47 is positioned within a cut-out section 33d provided at the downstream end of the membrane peeling-off blade 33 and is supported by a shaft so that the upper portion thereof protrudes upwardly from the membrane peeling-off blade 33.

As shown in FIGS. 12, 23 and 24, the washing nozzle block 48 is fixed to the base 21 adjacent to the downstream side of the rotary brush 47, and has a plurality of nozzles 57 and 58 fitted to the frame 55 having a substantially V-shaped groove 56 at the upper portion. The nozzle 57 serves to wash the rotary brush 47 and is secured to the upstream end of the frame 55. Further, the nozzles 58 are secured within the groove 56 of the frame 55 (refer to FIG. 24) in a row and serve to wash the interior of the belly of the fish 80 which is passing through the frame 55. Water under high pressure is supplied from a water feeding pipe 59 to the nozzles 57 and 58.

Figure 25A:
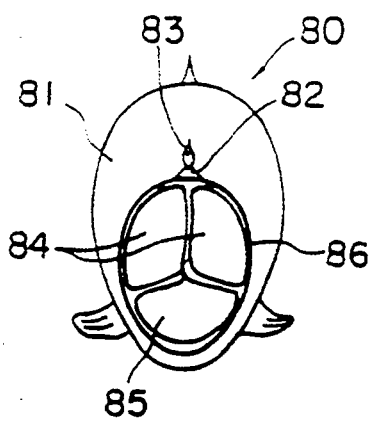
FIGS. 25(a) to 25(e) are explanatory views showing the steps of taking out the viscera of a fish in order.
Figure 25B:
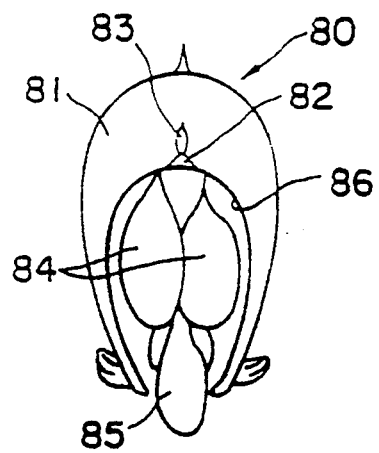
Figure 25C:
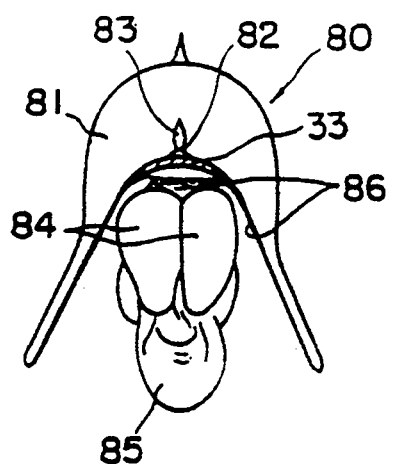
Figure 25D:
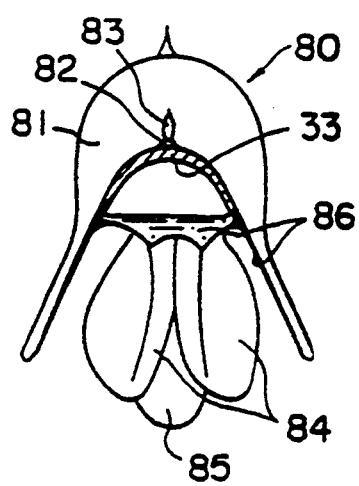

The operation of this embodiment is explained below. In FIG. 1, the fish 80, with the head cut off, which has the cross section shown in FIG. 25(a) is transferred to the right along the belly-supporting plate 1. As shown in FIGS. 3 to 5, the inserting portion 12 of the slide guide 10 is inserted into the belly of the fish 80, and at the same time, the rotary arm 22 is pressed by the front upper end portion of the fish 80 and thereby rotated counterclockwise. Rotation of the rotary arm 22 causes the frame 7 to be slightly rotated counterclockwise in FIG. 7 through the shaft 24, lever 25, rod 26, spring 28, supporting frame 19 and shaft 17 in this order, as shown in FIGS. 6 and 7. The angle of rotation of the frame 7 is changed in response to the shape of the fish 80 so that the position of the cutting blade 9 is normally automatically adjusted to the minimum depth of cut required to cut out the belly of the fish 80. The meat of the belly of the fish 80 is introduced between the inserting portion 12 of the slide guide 10 and the cutting blade 9 and only the meat of the belly is cut, as shown in FIG. 25(b). This ensures that the roes 84 in the body are not damaged.

As shown in FIG. 5, when the inserting portion 12 of the inserted slide guide 10 comes near the anus of the fish 80, the end of the inserting portion 12 is pressed by the fish meat to cause the spring 16 to extend through the lever 15 and the slide guide 10 to be moved downstream. This movement of the slide guide 10 largely exposes the cutting blade 9, so that it correctly cuts the fish body until the anus thereof. During such an operation, the first holding-down guide 30 holds down the upper surface of the fish 80 to prevent it from rising.

As shown in FIG. 8, the fish 80, which has passed through the slide guide 10 and has the belly incised, is placed on the stationary plate 32 and then guided to the membrane peeling-off blade 33. As shown in FIGS. 9 and 10, the membrane peeling-off blade 33 is inserted into the fish body and cuts the blood reservoir layer while peeling off the coelomic membrane (refer to FIGS. 25(c) and 25(d)). During this operation, the fish body is forced down by the holding-down roller 42 to thereby come into close contact with the membrane peeling-off blade 33. If the fish body is large, the membrane peeling-off blade 33 compresses the spring 36 to cause the pointed end thereof to be pivotally moved downwardly a little about the pivot 35, so that the fish body is prevented from being excessively pressed against the membrane peeling-off blade 33. This eliminates the phenomenon of scraping off the meat near the tail of the fish body, which is caused in the case where the membrane peeling-off blade is fixed.

Figure 25E:
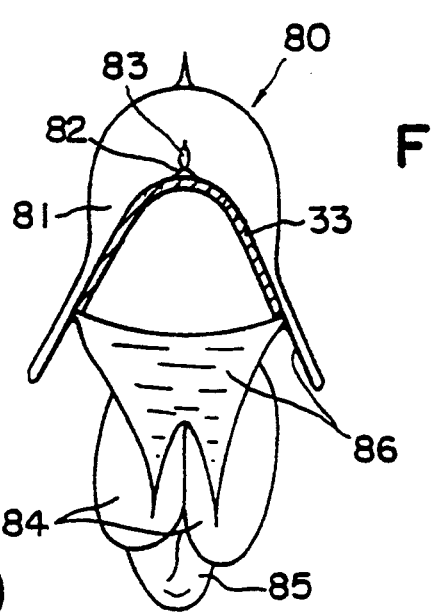

As shown in FIG. 25(e), the roes 84 and viscera 85 taken out from the fish body together with the coelomic membrane 86 are severed from the fish meat 81, fall and are recovered. Then, the fish 80, from the body of which the viscera 85 and roes 84 have been separated, is moved on the membrane peeling-off blade 33 while being prevented from rising by the second holding-down guide 34, and the blood reservoir is scraped out by the scraper 50 on the way. The scraper 50 sinks into the membrane peeling-off blade 33, extending the spring 45 in response to a change in the scraping-out resistance of the scraper 50 due to a change in the size of the fish body, thereby performing the necessary and sufficient scraping-out operation of the blood reservoir and avoiding damage to the fish body.

As shown in FIG. 12, the fish 80, from which the blood reservoir has been scraped out, is moved downstream on the membrane peeling-off blade 33 and the inwards remaining within the body cavity or coelom are removed by the rotating brush 47. Cleaning water is normally ejected from the nozzle 57 onto the brush 47 and foreign materials are washed away.

The fish 80 which has passed the brush 47 is placed onto the washing nozzle block 48 and the interior of the coelom is washed with cleaning water ejected from the nozzles 58.

In this way, the present embodiment enables the membrane peeling-off blade 33 to be adjusted to an optimal position in response to the size of the fish, and also the viscera and the like to be surely removed without damaging the fish meat.

Figure 26:
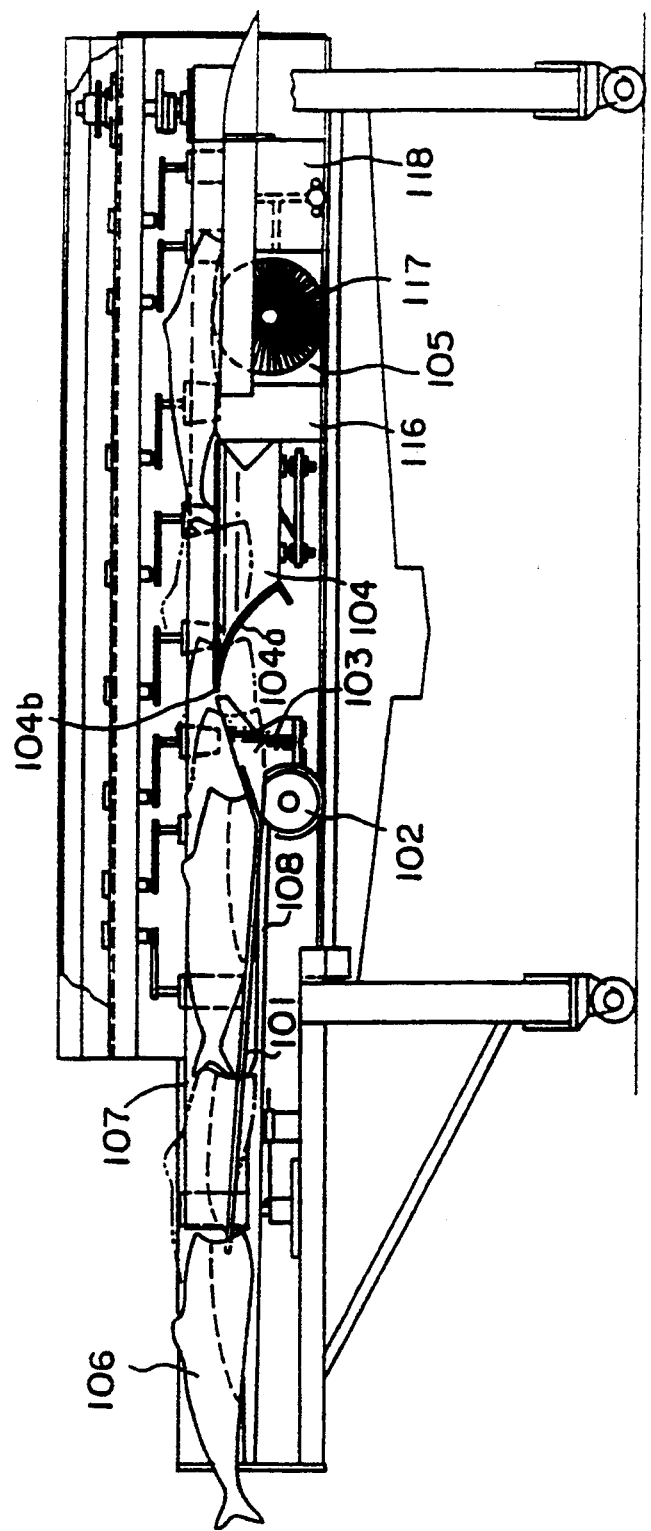
FIG. 26 is a view of the entire construction of an apparatus of taking out the viscera of a fish according to another embodiment of the invention.

Another embodiment of the present invention will now be explained with reference to FIG. 26. The apparatus according to the present embodiment performs the incision of the belly and the removal of the viscera in order while carrying the fish 80, from which the head is cut off, with the belly directed downward and the head directed forward, and comprises a guide rod 101, a cutting blade 102, a stationary bone-supporting plate 103, a membrane peeling-off blade 404 and a blood reservoir-removing mechanism 105 which are arranged in the carrying direction in this order. As shown in FIG. 26, the fish 80 with the body sandwiched from both sides between endless conveying belts 107 is transferred from the guide rod 101 to the blood reservoir-removing mechanism 105.

As shown in FIGS. 26 to 30, the guide rod 101 in the form of a round bar is positioned over the belly-supporting plate 108 which receives the lower surface of the fish 80 to guide it and is arranged with a falling gradient toward the downstream end. When the fish 80 placed on the belly placing plate 108 is transferred downstream while being held between both conveying belts 107, the guide rod 101 pierces the head of the fish body and comes out of the anus so that the position of the fish while being carried is maintained constant.

Figure 29:
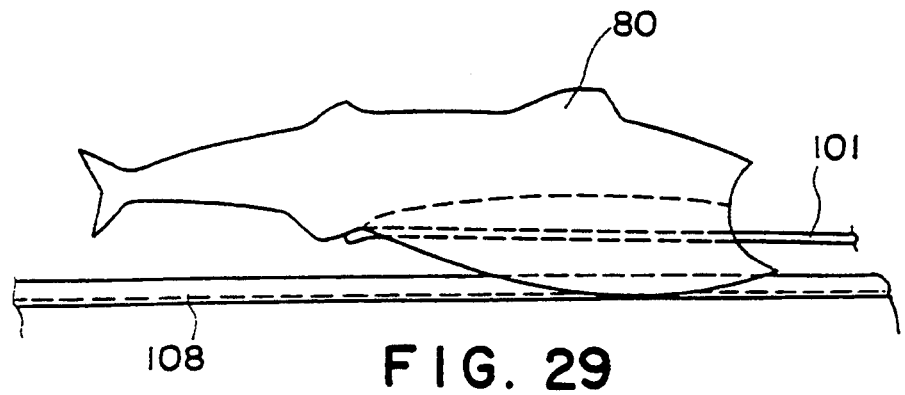
FIG. 29 is an explanatory view of the situation of a fish being spitted by the guide rod.
Figure 30:
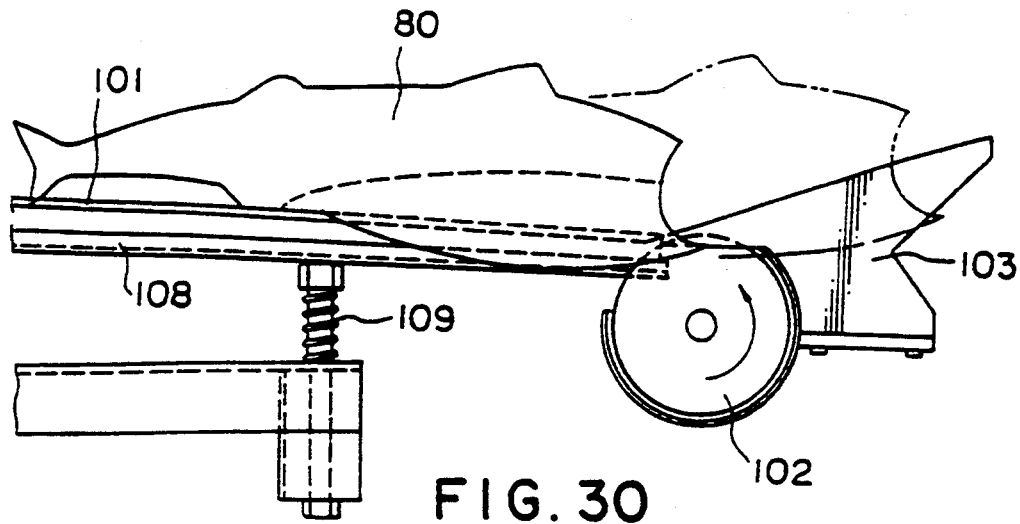
FIG. 30 is an explanatory view showing the situation of the incision of the belly by the cutting blade and the positioning of the bone by the stationary bone-supporting plate.

As shown in FIGS. 29 and 30, the belly-supporting plate 108 in the form of a trough extends in the carrying direction and can be moved up and down at the downstream end thereof with the upstream end as a fulcrum. Further, the downstream end of the belly-supporting plate 108 is energized so as to be pivotably moved upwardly by the biasing force of a spring 109, as shown in FIG. 30. Accordingly, as the fish 80 spitted by the guide rod 101 is carried to the downstream side of the guide rod 101, it is gradually pushed up on the belly-supporting plate 108, and at the position of the downstream end of the guide rod. 101 shown in FIG. 30, only the belly meat of the fish 80 comes to be sandwiched between the guide rod 101 and the belly-supporting plate 108. With this condition, the cutting blade 102 positioned at the downstream end of the guide rod 101 incises the lower edge of the belly of the fish 80, so that only the belly meat can be incised without damaging the roes and viscera.

As shown in FIGS. 26 to 28 and FIG. 30, a stationary bone-supporting plate 103 is provided adjacent to the downstream end of the guide rod 101. The stationary bone-placing plate 103 is in the form of a plate, the upper surface of which has a rising gradient toward the downstream side. The fish 80, the belly of which has been incised with the cutting blade 102, is guided and pushed up by the upper surface of the stationary bone-supporting plate 103, thereby positioning the bone.

The stationary bone-supporting plate 103 inserted into the belly of the fish 80 performs the vertical positioning of the bone 82 so that the pointed end of the membrane peeling-off blade 104 can surely be inserted into the gap G between the blood reservoir 83 and the coelomic membrane 86.

Figure 27:
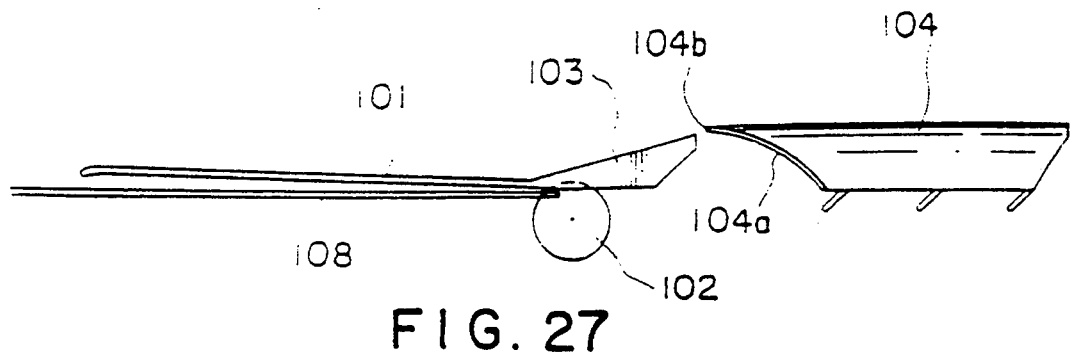
FIG. 27 is a structural view showing a relation in arrangement among a guide rod, a cutting blade, a bone supporting plate, a membrane peeling-off blade and a belly-supporting plate.
Figure 28:
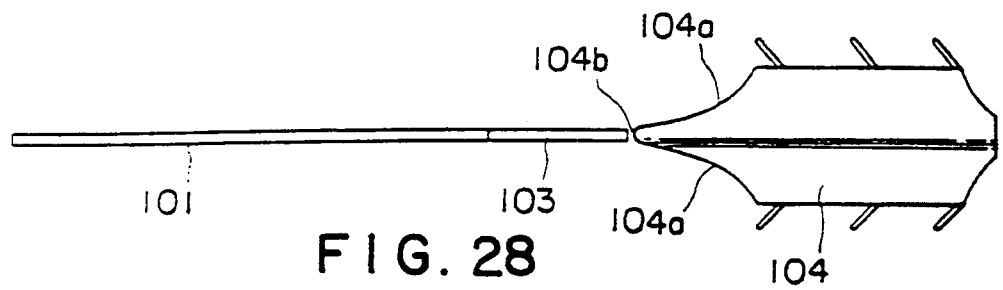
FIG. 28 is a plan view of an essential portion in FIG. 28.
Figure 31:
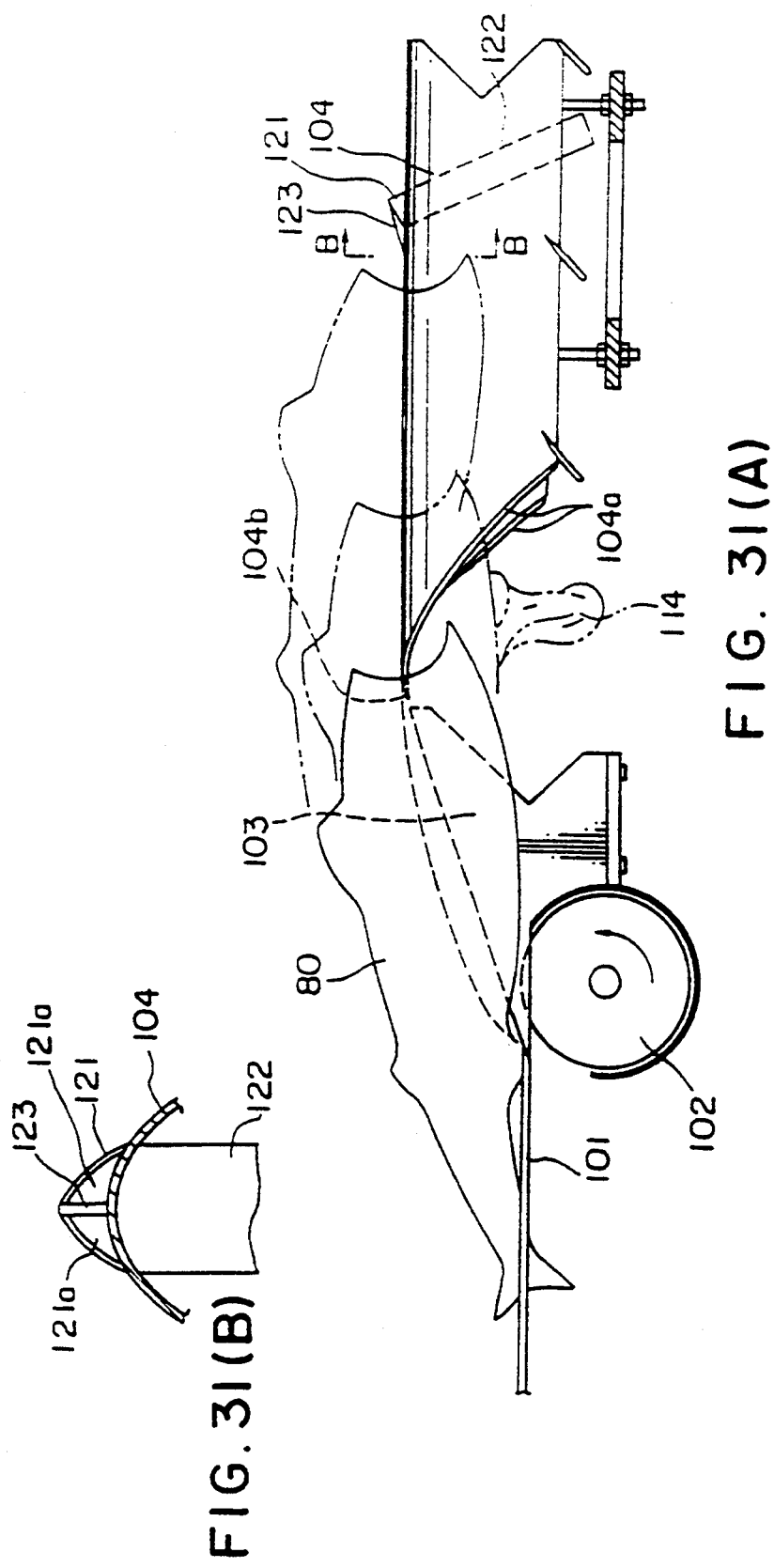
FIG. 31(A) is an explanatory view showing the condition of the viscera being taken out by the membrane peeling-off blade.
FIG. 31(B) is an enlarged side view as viewed from the direction of line B—B of FIG. 31 (A)

As shown in FIGS. 27, 28 and 31(A), the membrane peeling-off blade 104 is in the form of a trough having a cross section of an inverted U-shape, and both edges of the front end thereof are cut into a taper to form curved surfaces 104a and the front end 104b is sharpened. The membrane peeling-off blade 104 is provided at the downstream side of the stationary bone-supporting plate 103 so that the front end 104b thereof proceeds smoothly along with the upper surface of the stationary bone-supporting plate 103. As the fish 80 is moved downstream on the stationary bone-supporting plate 103, the front end 104b of the membrane peeling-off blade 104 is inserted gradually deeper into the gap G between the blood reservoir 83 and the coelomic membrane 86, thereby scraping the roes 84 and viscera 85 from the fish meat 81 together with the coelomic membrane 86.

As shown in FIG. 31(B) in detail, at the downstream side of the membrane peeling-off blade 104 is provided a projection 121, with which the blood reservoir 83 can be scraped out. The projection 121 consists of a hollow pipe 122 and is arranged in a fixed manner so that the upper portion thereof projects upwardly from the central top surface of the membrane peeling-off blade 104 and the lower portion thereof is inclined so as to drop downstream. At the upstream side of the projection 121 is disposed a triangle-like guide plate 123 having a side which reaches from the apex of the projection 121 to the top surface of the membrane peeling-off blade 104. The height of the projection 121 extending from the membrane peeling-off blade 104 is determined corresponding to the depth of the blood reservoir 83 of the fish 80 to be processed.

Figure 32:
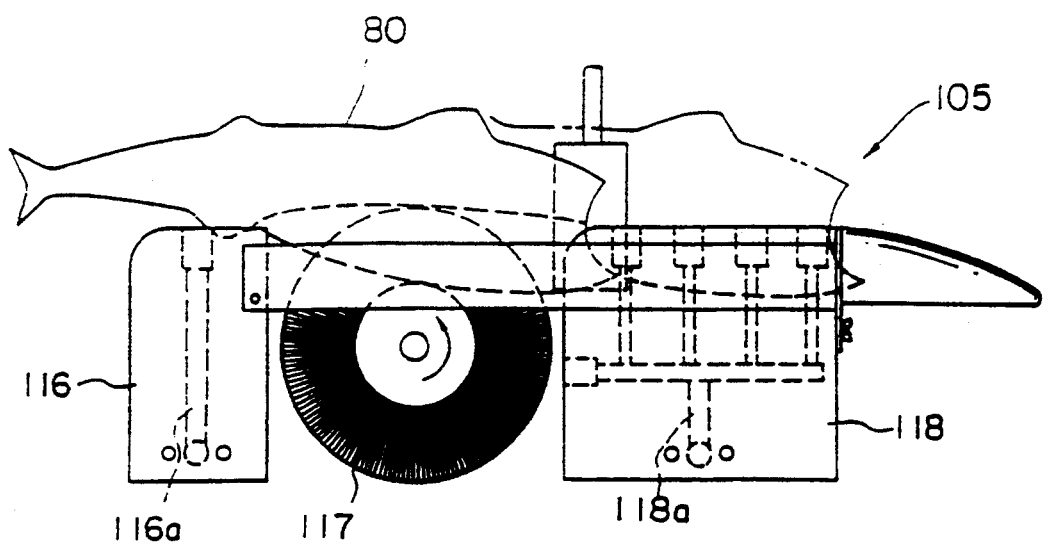
FIG. 32 is a structural view showing the detail of a blood reservoir-removing mechanism.
Figure 33:
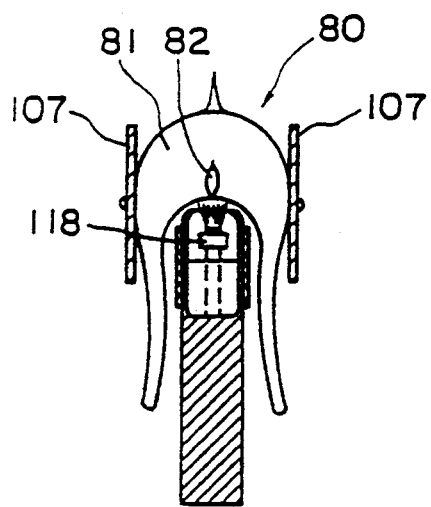
FIG. 33 is a sectional view as viewed in the conveying direction in FIG. 32.

As shown in FIGS. 32 and 33, the blood reservoir-removing mechanism 105 comprises a washing nozzle block 116 and a washing brush 117. The washing nozzle block 116 serves to force out the blood, which entered into the recess of the bone 82, by cleaning water under high pressure supplied from a water feed pipe 116a, and the washing brush 117 performs finishing washing by scraping down the forced-out blood. This blood reservoir removing mechanism 105 permits the blood reservoir 83 to be completely removed without damaging the fish meat 81. In this connection, if the fish meat 87 has a character of being easy to be damaged, the washing brush 117 is not necessarily be used.

The operation of the present embodiment will now be explained. The fish 80, the head of which has been only cut off and which is in the step before the belly is incised, is placed on the belly-supporting plate 108 and fed into the apparatus. Subsequently, as shown in FIG. 29, the guide rod 101 is inserted into the belly of the fish 80 and drawn out from the anus so that the fish 80 is spitted.

When the fish 80 is further fed downstream in the above-described condition, the belly of the fish 80 is incised with the cutting blade 102. At this time, since only the belly meat is incised with the cutting blade 102 with only the belly meat being sandwiched by the belly-supporting plate 108 and the guide rod 101, there is no danger of the roes 84 and viscera 85 being damaged.

The fish 80, the belly of which has been incised, is pushed up along the upper surface of the stationary bone-supporting plate 103 with a rising gradient, so that the vertical position of the bone 82 is determined in a predetermined position regardless of the size of the fish body.

When the fish 80, which has vertically been positioned by the stationary bone-supporting plate 103, is further carried downstream, the pointed end 104b of the membrane peeling-off blade 104 is automatically inserted into the gap G between the blood reservoir 83 and the coelomic membrane 86, and subsequent movement of the fish 80 causes the coelomic membrane 86 to be stripped from the fish 81. This simultaneously removes the roes 84 and viscera 85 wrapped in the coelomic membrane 86. The process during this operation is equal to that in the case of the previous embodiment shown in FIG. 25.

The fish, the coelomic membrane 86 of which has been removed, is subsequently fed downstream along the top surface of the membrane peeling-off blade 104, causing the projection 121 arranged in the rear of the membrane peeling-off blade 104 to enter into a portion of the blood reservoir 83. At this time, the bone 82 of the fish 80 is raised along the guide 123, and the projection 121 surely strikes against a part of the blood reservoir 83, thereby scraping down the blood reservoir 83 along with movement of the fish 80.

The blood reservoir 83, which has been scraped down, drops from the opening 121a, which opens at the upper portion of the top surface of the membrane peeling-off blade 104, downwardly of the membrane peeling-off blade 104, passing through the pipe 122.

In this way, the fish 80, from which the roes 84 and viscera 85 have been removed together with the coelomic membrane 86, is fed to the blood reservoir-removing mechanism 105, where the blood is completely removed, and then is discharged from the apparatus.

Stripping the coelomic membrane 86 from the fish meat 81 in this way enables the roes 84 and viscera 85 to be taken out from the fish without damaging the roes and viscera. Thus, there is no danger of lowering the value as a commodity of roes 84. Moreover, complete removal of the coelomic membrane 86 from the fish meat 81 enables removal of the blood reservoir 83 to be completely performed, and therefore, there is no danger of damaging the fish meat 81 when washed.

The present embodiment, which is simple in construction as compared with the above-described embodiment, permits the components of the apparatus to be reduced. However, it is inferior to the above-described embodiment in the function of coping with change in the size of a fish, and therefore, is suitable for the case where the fish, which is substantially the same in size, is processed.

Figure 34:
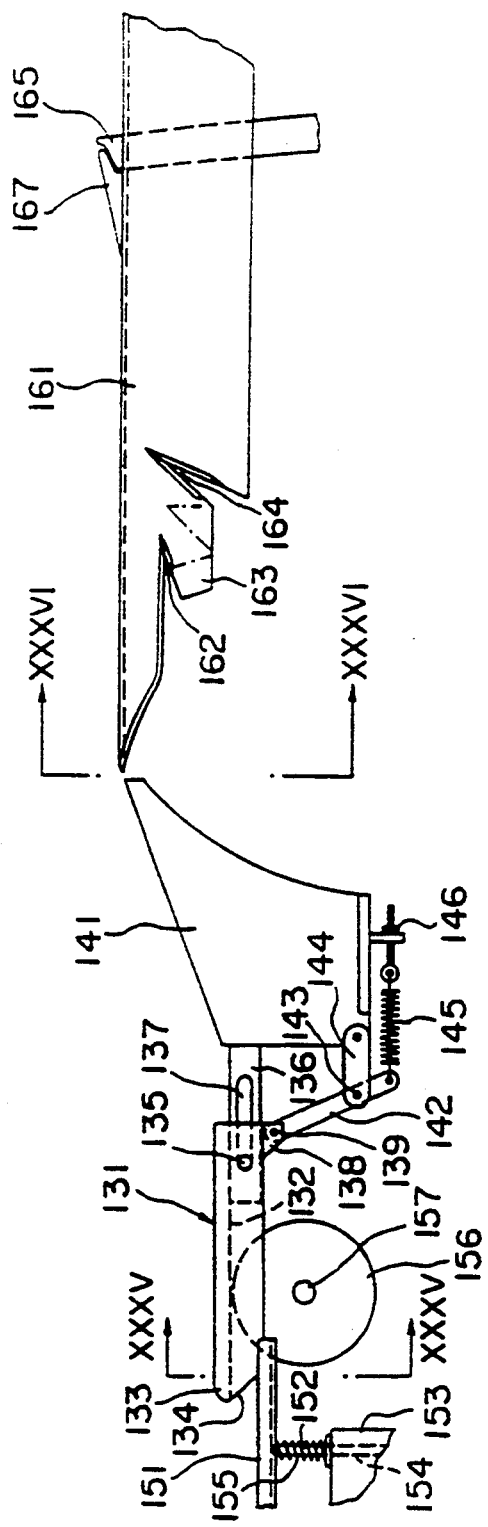
FIG. 34 is a front view of an essential portion of a further embodiment of the invention.
Figure 36:
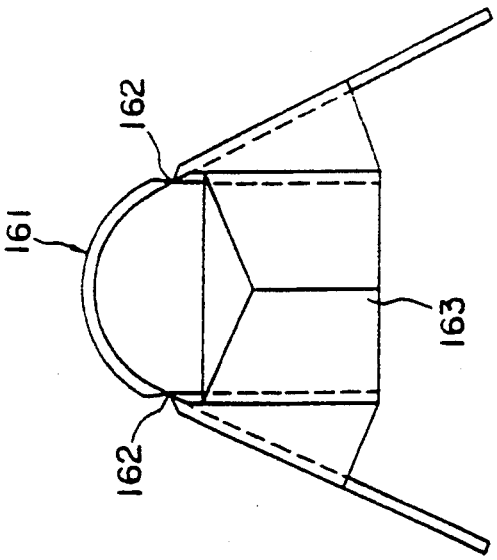
FIG. 36 is an enlarged view of an essential portion as viewed in the direction of line XXXVI—XXXVI of FIG. 34.

FIG. 34 is a side view of an essential portion showing a further embodiment of the viscera taking-out apparatus according to the present invention. In this embodiment, in place of the guide rod in the above-described embodiment, an elongated plate-like guide member 131 is arranged along the carrying passage for the fish 80.

Figure 35:
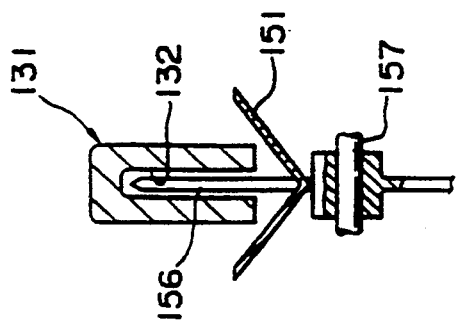
FIG. 35 is a sectional view taken along line XXXV—XXXV of FIG. 34.

As shown in FIG. 35, the guide member 131 has a concave groove 132 of an inverted U-shaped cross section which opens downward. At the end portion of the guide member 131 is formed a smoothly curved surface 133, which is followed by an inclined surface 134 falling from the end portion of the curved surface 133 downward in the carrying direction of the fish.

A guide pin 135 is fitted to the rear of the guide member 131 in such a manner that it intersects perpendicularly to the carrying direction and projects horizontally. The guide pin 135 is slidably inserted into the guide groove 137 of a supporting plate 136, which is fixed to a stationary bone-supporting plate 141 disposed at the downstream side of the guide member 131 and extends along the carrying passage.

At the lower end of the rear portion of the guide member 131 is provided a bracket 138 to which a link member 142 is pivotably connected by a pine 139. The link member 142 is pivotably connected at the middle thereof to the end of a stationary link member 144 by a pin 143 and connected at the lower end thereof to a spring 145. The other end of the stationary link member 144 is secured to the stationary bone-supporting plate 141, and the other end of the spring 145 engages the lower end of the stationary bone-supporting plate 141 by a threaded rod and an adjusting nut 146. The biasing force of the spring 145 can be adjusted by the adjusting nut 146.

The forward portion of the guide member 131 is positioned over the downstream end of the trough-like belly-supporting plate 151. Under the downstream end of the belly-supporting plate 151 vertically projects a supporting rod 152 which is inserted into the guide bore 154 of a body frame of the apparatus so as to be able to be vertically moved. Around the outer periphery of the supporting rod 152 is fitted a spring 155 which serves to elastically support the belly-supporting plate 151 horizontally.

A cutting blade 156 for cutting the belly of the fish 80 is provided under the guide member 131 in such a manner that the upper portion thereof is inserted into the concave groove 132 of the guide member 131, as shown in FIG. 35. As the cutting blade 156, a rotary blade is used which is rotated about a rotary shaft 157, similarly to the above-described embodiment.

At the downstream side of the stationary plate 141 is provided a membrane peeling-off blade 161 in the form of an inverted U-shaped groove, similarly to the above-described embodiment.

The membrane peeling-off blade 161 is provided with first and second notched parts 162 and 164 for cutting off the viscera and a substantially triangle-like belly-enlarging part 163 which projects toward the stationary bone-supporting plate 141, similarly to the above-described first embodiment.

Figure 40:
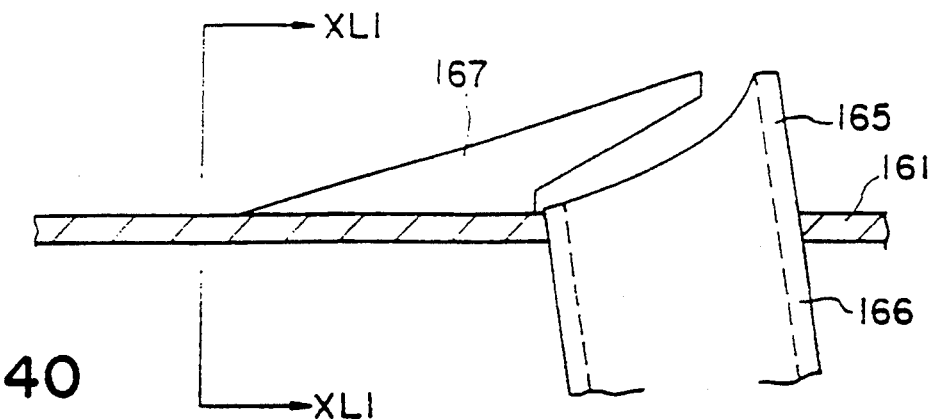
FIG. 40 is a fragmentary enlarged sectional view showing an example of the blood reservoir-removing mechanism.
Figure 41:
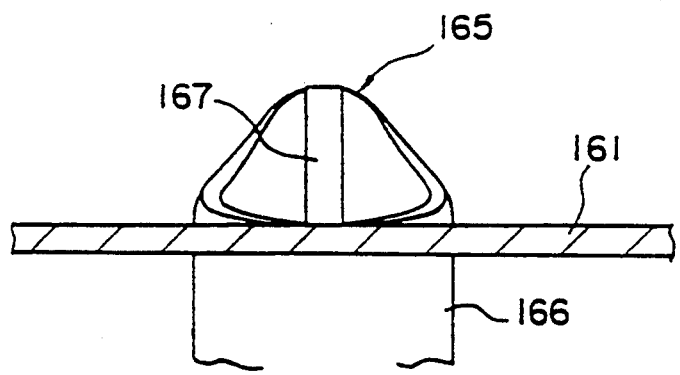
FIG. 41 is a sectional view taken along line XLI—XLI of FIG. 40.

On the rear and top portion of the membrane peeling-off blade 161 is provided a projection 165 for scraping off the blood reservoir 83, similarly to the above-described embodiment. As shown in FIGS. 40 and 41 on an enlarged scale, provision of the projection 165 is made so that it is arranged in an inclined position with the upper portion of the hollow pipe 166 projecting upwardly through the middle top face of the membrane peeling-off blade 161 and the lower portion thereof falling downstream. At the upstream side of the projection 165 is provided a triangle-like guide plate 167 having a side which extends from the top of the projection 165 to the top surface of the membrane peeling-off blade 161.

Figure 42:
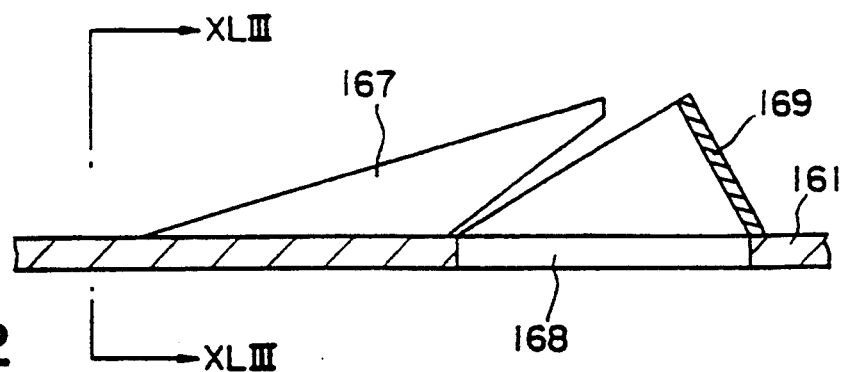
FIG. 42 is a fragmentary enlarged view showing an example of the blood reservoir-removing mechanism.
Figure 43:
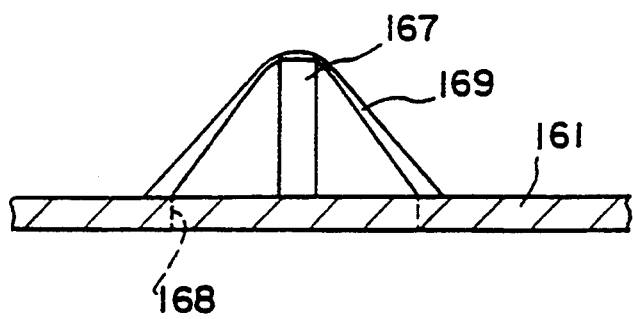
FIG. 43 is a sectional view as viewed in the direction of XLIII—XLIII of FIG. 42.

As a modified embodiment of the projection 165, the membrane peeling-off blade 161 may be provided at the middle and top surface with an opening 168, which is enclosed by a scraping-off frame 169 in the form of a substantially trigonal pyramid opening at the upstream side thereof, as shown in FIGS. 42 and 43.

Figure 37:
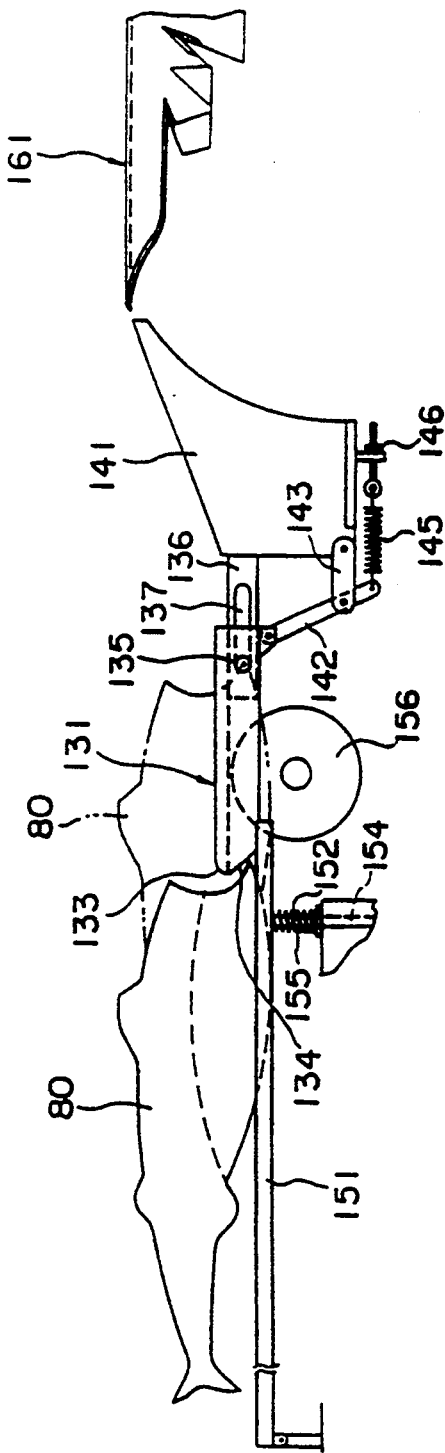
FIG. 37 is a front view corresponding to FIG. 34 for explaining the operation of the apparatus according to the invention.

The operation of the present embodiment constructed as described above will now be explained. The fish 80, the head of which is cut off and which is in a step before the belly is incised, is placed on the belly-supporting plate 151 and carried by conveying belts, as shown in FIG. 37. When the lower portion of the front end of the fish 80 comes into contact with the inclined surface 134 of the guide member 131, the front lower end portion of the fish 80 attempts to advance while being moved downwardly along the inclined surface 134. The force by which the fish attempts to advance causes the end of the belly-supporting plate 151 to be moved downwardly against the biasing force. This makes the guide member 131 enter into the belly of the fish 80 completely, and subsequent movement of the fish causes the guide member 131 to be inserted deeply into the belly. Simultaneously with this, the lower belly portion of the fish 80 is caused to pass the top of the cutting blade 156, and the lower belly portion is continuously incised.

Figure 38:
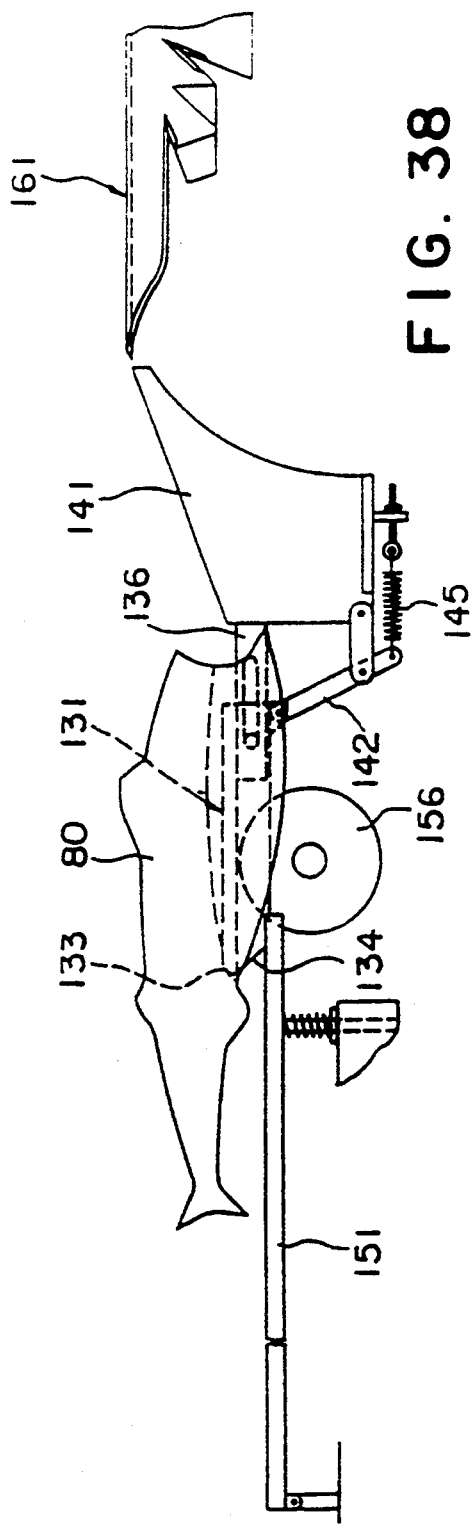
FIG. 38 is a front view corresponding to FIG. 34 for explaining the operation of the invention.

When the fish 80 reaches the position where the front lower end portion of the fish 80 comes into contact with the stationary bone-supporting plate 141, the front curved surface portion 133 of the guide member 131 comes into contact with the meat wall near the anus of the fish 80, as shown in FIG. 38. This causes the front end of the guide member 131 to be pressed by the fish 80, and then the link member 142 to be pivotally moved against the biasing force of the spring 145, so that the guide member 131 is moved back along the supporting plate 136 toward the stationary bone-supporting plate 141.

Figure 39:
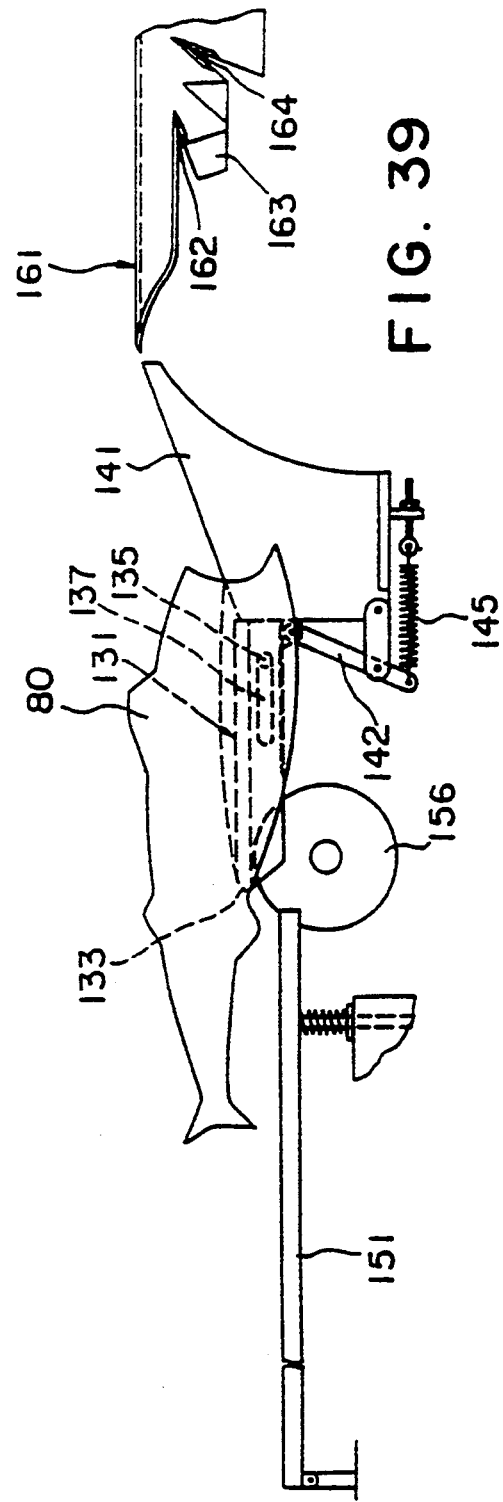
FIG. 39 is a front view corresponding to FIG. 34 for explaining the operation of the invention.

Backward movement of the guide member 131 exposes the cutting blade 156 from the guide member 131, as shown in FIG. 39, and the lower belly portion is completely cut. When the cutting operation of the lower belly portion with the cutting blade 156 is finished, the force of pressing the guide member 131 is released and the guide member 131 is restored to the original position by the biasing force of the spring 145.

The front end of the fish 80 is guided and pushed up by the inclined surface of the stationary bone-supporting plate 141, and while the bone is positioned, the fish 80 is carried to the position of the membrane peeling-off blade 161.

The pointed end of the membrane peeling-off blade 161 is inserted into the gap between the blood reservoir 83 and the coelomic membrane 86 (refer to FIG. 11), thereby stripping the roes 84 and viscera 85 from the fish meat 81 together with the coelomic membrane 86.

The roes 84 and viscera 85, which have been stripped from the fish meat 81 together with the coelomic membrane 86, are more surely cut and removed from the fish meat 81 by the notched part 162. This notched part 162 enables the viscera to be surely removed even if there is any change in the shape and size of the viscera depending on the kind, sex distinction and size of the fish 80. Further, the belly-enlarging part 63 in the form of a substantially triangle provided at the lower position of the membrane peeling-off blade 161 performs to stretch out the belly of the incised fish 80 on either side, making an operation of peeling-off the coelomic membrane 86 due to the membrane peeling-off blade 161 more surely.

Further, if any of the viscera remains, it is completely cut and removed with the second notched part 164, and drops under the membrane peeling-off blade 161. Moreover, the blood reservoir 83 is scraped off and removed by the projection 165 provided at the downstream side of the membrane peeling-off blade 161.

Since the present embodiment uses a guide member 131 provided with the concave groove 132 in which the upper portion of the cutting blade 156 is inserted and arranged, the lower belly portion of the fish 80 can surely be incised in an accurate position. In addition, since the membrane peeling-off blade 161 is provided with the notched parts 162 and 164 and enlarging part 163 for cutting the viscera, operations of removing the viscera and stripping off the coelomic membrane 86 can more surely be performed.

This embodiment shows an example in which the upper portion of the cutting blade 156 is inserted and arranged in the concave groove 132 of the guide member 131; however, the upper portion of the cutting blade 156 may be arranged close to the side surface of the guide member 131.

As described above, the method and apparatus of taking out the viscera of a fish according to the invention, which is devised to strip the fish meat from the coelomic membrane to thereby remove the roes and viscera from the fish meat, enables the viscera to be removed without damaging the roes and viscera and also the fish meat. Further, since the coelomic membrane is completely taken out, the blood reservoir can also completely be removed.

What is claimed is:

1. An apparatus of taking out the viscera of a fish comprising:
   carrying means for moving forward said fish the head of which is cut off;
   cutting blade means for incising the belly of said fish which is being moved;
   guide rod means which is positioned at the upstream side of said cutting blade means and which is adapted to be inserted into the body of said fish from the head side of said fish and to be drawn out from the anus to control the position of said fish when being cut by said cutting blade means;
   stationary bone-supporting plate means which is positioned at the downstream side of said cutting blade means, and which has an upper surface inclined downstream with a rising gradient to place the bone within the body of said fish thereon to cause said fish to rise, thereby performing the positioning of the bone of said fish; and
   blade means for peeling off a membrane of the fish, which is positioned at the downstream side of said bone-placing plate means and which has an inverted U-shaped cross section which is adapted to be inserted in between the inner wall of the meat of said fish and a coelomic membrane and enables roe, viscera and the like to be stripped from the meat of said fish together with said coelomic membrane.

2. An apparatus of taking out the viscera of a fish comprising:
   carrying means for moving forward said fish the head of which is cut off;
   cutting blade means for incising the belly of said fish which is being moved;
   guide means which is positioned over said cutting blade, which has a concave groove opening downward to receive the upper portion of said cutting tool, and which is arranged along a carrying passage so that said guide means is inserted into the body of said fish and sandwiches the belly meat of said fish between said guide means and said cutting blade;
   stationary bone-supporting plate means which is positioned at the downstream side of said cutting blade and which has an upper surface inclined downstream with a rising gradient to place the bone within the body of said fish thereon to cause said fish to rise, thereby performing the positioning of the bone of said fish; and
   blade means for peeling off a membrane of the fish, which is positioned at the downstream side of said bone-supporting plate and which has an inverted U-shaped cross section which is adapted to be inserted in between the inner wall of the meat of said fish and a coelomic membrane and enables roe, viscera and the like to be stripped from the meat of said fish together with said coelomic membrane.

3. The apparatus of taking out the viscera of a fish as claimed in claim 1 or 2, wherein said blade means comprises a body part fixed to said apparatus; a holder part detachably fitted to the front end of said body part; and a blade part detachably fitted to the front end of said holder part.

* * * * *